US012673007B2

(12) United States Patent
Omura

(10) Patent No.: US 12,673,007 B2
(45) Date of Patent: Jul. 7, 2026

(54) MEDICINE DISPENSING APPARATUS

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 159 days.

(21) Appl. No.: 18/703,598

(22) PCT Filed: Oct. 25, 2022

(86) PCT No.: PCT/JP2022/039597
§ 371 (c)(1),
(2) Date: Apr. 22, 2024

(87) PCT Pub. No.: WO2023/080006
PCT Pub. Date: May 11, 2023

(65) Prior Publication Data

US 2025/0235385 A1 Jul. 24, 2025

(30) Foreign Application Priority Data

Nov. 2, 2021 (JP) ................................ 2021-179557
Nov. 2, 2021 (JP) ................................ 2021-179750

(51) Int. Cl.
*A61J 7/00* (2006.01)

(52) U.S. Cl.
CPC .................................. *A61J 7/0076* (2013.01)

(58) Field of Classification Search
None
See application file for complete search history.

(56) References Cited

U.S. PATENT DOCUMENTS 7,331,151 B2 2/2008 Kim
9,186,301 B2 11/2015 Omura et al.
10,052,260 B2 8/2018 Omura et al.
(Continued)

FOREIGN PATENT DOCUMENTS

CN 1509941 A * 7/2004 ............ B65B 39/04
JP 2001-087353 A 4/2001
(Continued)

OTHER PUBLICATIONS

International Search Report corresponding to International application No. PCT/JP2022/039597, dated Dec. 6, 2022, 2 pages.
(Continued)

*Primary Examiner* — Tanzim Imam
(74) *Attorney, Agent, or Firm* — Rankin, Hill & Clark LLP

(57) ABSTRACT

A tablet dispensing apparatus in which the work of cleaning for tablet falling surfaces in an accumulating chute and a gathering chute of a lower tablet collecting mechanism can be easily and accurately carried out. The accumulating chute is forwardly drawn from a housing accompanied by a manual medicine dispensing device, and an accumulating chute support member is provided on a drawer mechanism, and the accumulating chute can be configured to attach and detach by a hunger on an upper end of the accumulating chute support member. Further, when the accumulating chute is forwardly drawn, the gathering chute can be moved backward along a gathering chute support member, and the gathering chute can be attached and detached by holding a handle member.

12 Claims, 11 Drawing Sheets

(56) References Cited

U.S. PATENT DOCUMENTS

| | | | | |
|---|---|---|---|---|
| 2004/0261357 | A1 | 12/2004 | Takahashi et al. | |
| 2013/0270291 | A1* | 10/2013 | Omura | A61J 7/0084 221/92 |
| 2014/0190986 | A1* | 7/2014 | Kikuchi | A61J 7/0076 221/277 |
| 2014/0245697 | A1 | 9/2014 | Omura et al. | |
| 2015/0101291 | A1* | 4/2015 | Ishiwatari | G07F 11/42 221/21 |
| 2019/0088070 | A1 | 3/2019 | Patel et al. | |
| 2020/0391887 | A1 | 12/2020 | Takada et al. | |

FOREIGN PATENT DOCUMENTS

| | | | | | |
|---|---|---|---|---|---|
| JP | 2007-216485 | A | | 8/2007 | |
| JP | 2012-135388 | A | | 7/2012 | |
| JP | 2013-078525 | A | | 5/2013 | |
| JP | 2013-085666 | A | | 5/2013 | |
| JP | 2018-196709 | A | | 12/2018 | |
| JP | 2019-216991 | A | | 12/2019 | |
| KR | 20150007490 | A | * | 1/2015 | B65B 5/103 |
| WO | WO-2019244825 | A1 | * | 12/2019 | A61J 3/00 |

OTHER PUBLICATIONS

Extended European Search Report dated Aug. 4, 2025 issued in corresponding European application No. 22889826.8; English text (68 pages).

* cited by examiner

Fig. 10B (E-E cross section)
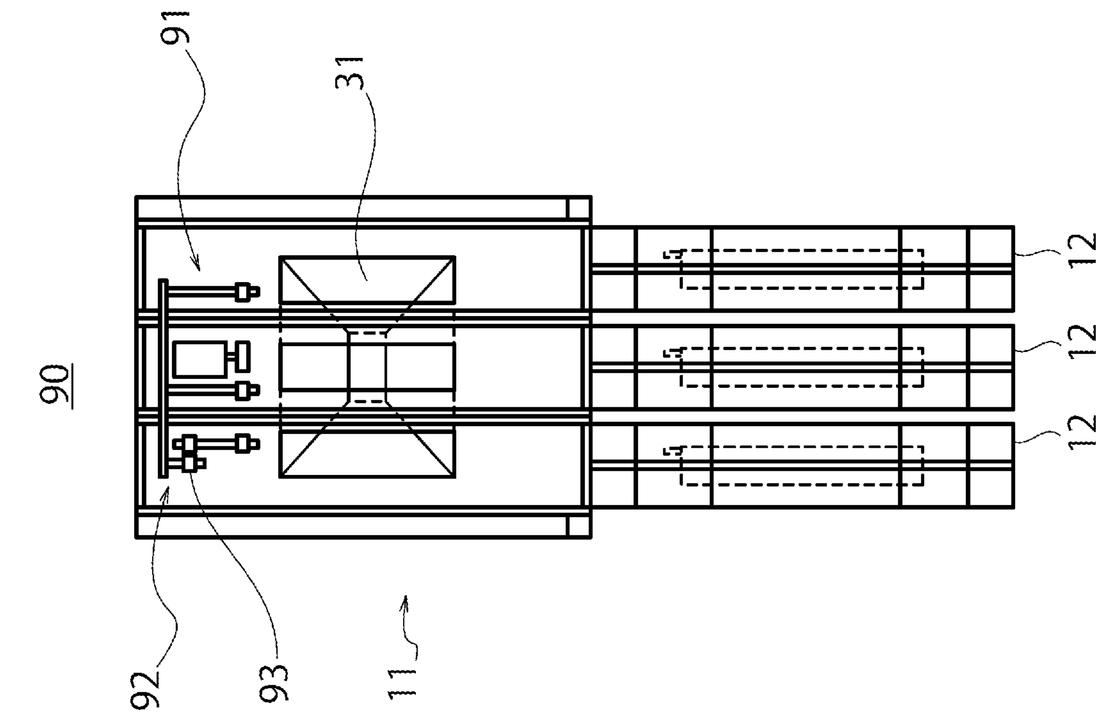
Fig. 10A
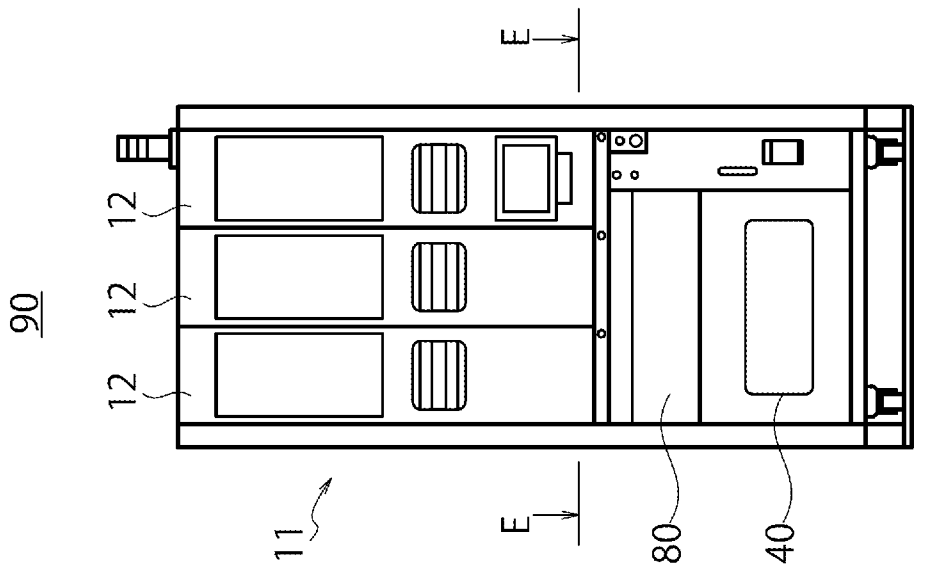

MEDICINE DISPENSING APPARATUS

TECHNICAL FIELD OF THE INVENTION

The present invention relates to a medicine dispensing apparatus in which a plurality of tablet feeder storage portions provided in a housing can each be pulled out from the housing.

BACKGROUND OF THE INVENTION

In a medicine dispensing apparatus that handles various types of tablets (medicines), it is required to maintain a tablet falling path (a falling medicine collecting path) as clean as possible. Therefore, as a measure to reduce the burden of maintaining a necessary clean state, so to speak, people have tried to "strengthen the stain resistance" by reducing the dust generated from collected medicines in the first place and to "make cleaning easier" by allowing dust to be removed quickly.

In a specific example of a conventional medicine dispensing apparatus, a packing device is located at the bottom of the tablet falling path (for example, see Patent Document 1). Almost all the components, such as packing band supply mechanism, packing band feeding mechanism, packing band printing mechanism, packing band sealing mechanism, etc. in addition to an input hopper that receives medicines dropped from a lower tablet collecting mechanism are mounted on a drawable base member. The above-mentioned components can be exposed from the housing toward the front accompanied with the base member.

Therefore, the packing device is easy to clean and the burden of maintaining a clean state is light.

In addition, another conventional medicine dispensing apparatus including an upper tablet collecting mechanism built into the tablet feeder storage portion is vertically divided into left and right parts along with the tablet feeder storage portion so that one side of the divided parts can be forwardly drawn from the housing (for example, see Patent Documents 2 and 3). There is also another conventional medicine dispensing apparatus in which the vertically divided portion of the upper tablet collecting mechanism can be opened wide by moving the tablet feeder storage portion that is forwardly drawn (for example, see FIG. 2 of Patent Document 4).

These conventional medicine dispensing apparatuses can be easily cleaned by exposing a tablet falling surface (the surface that the falling tablets hit) of the upper tablet collecting mechanism in front of the housing, so that the burden of maintaining a clean state is light.

Furthermore, in such conventional medicine dispensing apparatuses in which a temporary reserving mechanism is attached to the lower end of the upper tablet collecting mechanism (for example, see, FIG. 1 of Patent Document 2 and FIG. 4 of Patent Document 3), the tablet falling surface of the temporary reserving mechanism can also be easily cleaned by pulling the temporary reserving mechanism accompanied with the upper tablet collecting mechanism forward from the housing and exposing the tablet falling surface in front of the housing, so that the burden of maintaining a clean state is light. Generally, pairs of the tablet feeder storage portion and the upper tablet collecting mechanism are usually installed in multiple rows and the temporary reserving mechanism comprises multiple single-row reserving mechanisms. Each of the single-row reserving mechanisms is attached on a one-to-one basis below the upper tablet collecting mechanisms.

In addition, the single-row reserving mechanism (in the temporary reserving mechanism) comprises the left and right side plates and the front and rear plates which are made of square or rectangular plates, which are almost vertical standing plates (for example, see, FIG. 4 of Patent Document 2 and FIG. 8 of Patent Document 3).

Moreover, a front part and a last part of the lower end of the upper tablet collecting mechanism are made oblique and the lower end of the upper tablet collecting mechanism is made a lower constriction structure (for example, FIG. 4 of Patent Document 2 and FIG. 4 of Patent Document 3). The front-to-back length of the temporary reserving mechanism is made shortened. The driving mechanism is arranged at a position rearward of the temporary reserving mechanism and at a position rearward of the upper end of the lower tablet collecting mechanism. Thereby, when the tablet feeder storage portion is forwardly drawn, the upper tablet collecting mechanism and the temporary reserving mechanism also move forward accompanied by the tablet feeder storage portion, thereby securing a space directly above the lower tablet collecting mechanism.

Therefore, if the side plate of the housing of this conventional medicine dispensing apparatus is removed as described above with securing the space directly above the lower tablet collecting mechanism, or if the space directly above the lower tablet collecting mechanism is secured after removing the side plate, a fixed chute (a first falling object collection section) located at the top portion of the lower tablet collecting mechanism can be cleaned relatively easily from the side, so that the burden of maintaining the clean state is light.

In addition, another conventional medicine dispensing apparatus has a manual medicine dispensing device which is provided in front of the lower tablet collecting mechanism, and is forwardly drawn from the housing when dispensing manually, and is pushed into the housing after manual dispensing (for example, see FIG. 1 of Patent Document 5). This medicine dispensing apparatus comprises the lower tablet collecting mechanism (for example, see, FIGS. 4 to 6 of Patent Document 5) which includes a fixed chute that collects the medicines that have fallen from the plurality of temporary reserving mechanisms to a certain extent, an accumulating chute (a second falling object collection section) provided in a lower part of the fixed chute and a gathering chute (a third falling object collection section) provided in further below the accumulating chute.

The accumulating chute is configured to further collect the medicines that have fallen from the fixed chute directly above towards the center. The gathering chute is configured to collect the medicines have that fallen from the accumulating chute and the medicines that have fallen and discharged from the manual medicine dispensing device while merging both together. Therefore, when the manual medicine dispensing device is pushed into the housing (for example, see FIG. 4 of Patent Document 5), the accumulating chute is located below the fixed chute and the gathering chute is located below the accumulating chute. Not only the medicines discharged from the tablet feeder but also the medicines discharged from the manual medicine dispensing device are collectively thrown into the input hopper of the packing device.

In addition, in this conventional medicine dispensing apparatus, when the manual medicine dispensing device is forwardly drawn from the housing (for example, see FIG. 5 of Patent Document 5), the accumulating chute and the gathering chute are forwardly drawn together from the housing. By exposing the tablet falling surface of the accumulating chute in front of the housing, it can be easily cleaned, so that the burden of maintaining a clean state of the accumulating chute is relatively light.

Furthermore, in this conventional medicine dispensing apparatus, the accumulating chute and the manual medicine discharging chute of the manual medicine dispensing device can be slid rearward together while the manual medicine dispensing device forwardly drawn from the housing. Then (for example, see, FIG. 6 of Patent Document 5), the upper part of the accumulating chute can be opened. Therefore, the gathering chute can also be cleaned by exposing the tablet falling surface between the housing and the manual medicine dispensing device.

RELATED ART DOCUMENTS

Patent Documents

Patent Document 1: Japanese Unexamined Patent Application Publication No. 2007-216485

Patent Document 2: Japanese Unexamined Patent Application Publication No. 2013-078525

Patent Document 3: Japanese Unexamined Patent Application Publication No. 2013-085666

Patent Document 4: Japanese Unexamined Patent Application Publication No. 2018-196709

Patent Document 5: Japanese Unexamined Patent Application Publication No. 2019-216991

SUMMARY OF THE INVENTION

Technical Problem

However, in the conventional structure, even if the exposed accumulating chute and gathering chute that are forwardly drawn from the housing accompanied by the manual medicine dispensing device are easy to clean considering the above-mentioned components installed at a rear of the manual medicine dispensing device, it is not as easy to clean as the upper tablet collecting mechanism and the temporary reserving mechanism described above.

With respect to the gathering chute, it is, in particular, not easy to clean the tablet falling surface beyond the manual medicine dispensing device by extending operator's hand from the front, where the rear end portion of the manual medicine dispensing device approaches diagonally from above. Also, it cannot be said that visually checking the cleaning results from the front is not easier than visually checking the cleaning results of the accumulating chute.

Furthermore, when cleaning the tablet falling surface of the gathering chute from the side as, in the case of the temporary reserving mechanism, cleaning is carried out through the gap between the manual medicine dispensing device and the housing, so cleaning cannot be said to be easy. To be more specific, in the case that the tablet falling surface is cleaned through the gap between the rear end of the manual medicine dispensing device that has been forwardly drawn and the front of the housing, which is large in height and width, or the manual medicine discharging chute that has been moved to the front of the housing, great care must be taken to avoid damaging the manual medicine dispensing device, which has a complex and delicate structure, or touching the operating members on the front of the housing.

In addition, among the left and right side plates of the temporary reserving mechanism, the side plate that faces the swinging plate and fixedly forms the medicine falling path, the so-called opposing fixed side plate, has been developed as so-called inclined opposing fixed side plate. The so-called opposing fixed side plate has an upper portion being separated from the swinging plate and a lower portion being in close proximity from and inclined with the swinging plate. In such a temporary reserving mechanism, the role and burden of temporarily stopping the tablets that have fallen from the upper tablet collecting mechanism is not only carried by the swinging plate, but also shared by the inclined opposing fixed side plate, so that the burden placed on the swinging plate, which is difficult to strengthen due to movable members, is reduced. However, when the temporary reserving mechanism is opened by swinging downward the swinging plate, the medicines that fall downward from the temporary reserving mechanism follow the slope of the inclined opposing fixed side plate. Then the number of medicines fall diagonally downward increase and become a large part of all medicines. The medicines then fall obliquely from the temporary reserving mechanism to the fixed chute in the lower tablet collecting mechanism located directly below the temporary reserving mechanism. If the medicines fall into a part of the fixed chute where the slope of the tablet falling path forming surface and the slope of the inclined opposing fixed side plate are not aligned, especially the medicines falling on the part inclined in the opposite direction has the impact when contacting and being the bigger amount of change in the direction. As the results, there is a concern that the amount of dust generated will increase, and furthermore, the downward movement of the falling tablets tends to be delayed and the passing time tends to vary.

Moreover, in situations where multiple or a plurality of temporary reserving mechanisms are lined up from the left to right at the same height, in particular when comparing the temporary reserving mechanism located at the left end with the temporary reserving mechanism located at the right end, the amount of dust generated and the passing time are noticeable discrepancies.

An object of the present invention is to provide a tablet dispensing apparatus to enable easy and reliable cleaning of the tablet falling surface of the accumulating chute and the gathering chute, in order to further reduce the burden of maintaining cleanliness regarding the gathering chute and the accumulating chute in the lower tablet collecting mechanism.

Another object of the present invention is to provide a tablet dispensing apparatus that can suppress soiling and reduce the tablet collection time by reducing the amount of dust generated and the variation in tablet falling speed in the fixed chute of the lower tablet collecting mechanism, in order to further reduce the burden of maintaining the cleanliness of the fixed chute of the lower tablet collecting mechanism.

Solution to the Problem

Tablet dispensing apparatus to be improved by the present invention comprises a housing, a plurality of tablet feeder storage portions equipped with a plurality of tablet feeders that accommodate tablets and sequentially discharge the tablets, configured to be housed in the housing and to be individually drawable forwarding from the housing, a plurality of upper tablet collecting mechanisms, each of which is provided in the tablet feeder storage portion and which guides the tablets discharged from the plurality of tablet feeders downward and drops the tablets, a lower tablet collecting mechanism provided below the plurality of tablet feeder storage portions and configured to collect the tablets that have fallen from the plurality of upper tablet collecting mechanisms and to fall down the tablets downward, a packing device provided under the lower tablet collecting mechanism to separately pack the tablets discharged from the lower tablet collecting mechanism into a packing band, and a manual medicine dispensing device placed in front of the lower tablet collecting mechanism and configured to be drawable forwarding from the housing. The lower tablet collecting mechanism includes an accumulating chute accumulating fallen tablets discharged from the upper tablet collecting mechanisms at the rear of the manual medicine dispensing device, and a gathering chute letting fall while gathering both the tablets fallen from the accumulating chute and the tablets fallen from the manual medicine dispensing device.

In the present invention, the accumulating chute is forwardly drawn out of the housing accompanied by the manual medicine dispensing device to be forwardly drawn out of the housing. In addition, an accumulating chute supporting member detachably supporting the accumulating chute is positioned while standing at a rear of the manual medicine dispensing device. Moreover, the accumulating chute is attached to the accumulating chute support member with an upper end of the accumulating chute resting on an upper end of the accumulating chute support member.

In the medicine dispensing apparatus of the present invention, when the manual medicine dispensing device is forwardly drawn from the housing, the accumulating chute that is pulled out from the housing can be removed accompanied by the manual medicine dispensing device. As a result, the work of attaching and detaching the accumulating chute, which is performed by looking down from above, and the work of cleaning for the tablet falling surface of the accumulating chute can be easily and accurately carried out. Further, the work of cleaning for the tablet falling surface of the gathering chute located below can be easily and accurately carried out just by the empty space if utilizing the empty space expanded by removing the accumulating chute.

Furthermore, when making the accumulating chute removable, an accumulating chute support member that stands up at a rear of the manual medicine dispensing device is provided so that the accumulating chute can be attached and detached at an upper end of the accumulating chute. The work of attaching and detaching the accumulating chute, which is performed by looking down from above, can be easily and quickly carried out. As a result, the working space for the gathering chute can be easily and quickly secured by the empty space provided at the rear of the manual medicine dispensing device. Therefore, according to the present invention, it is possible to reduce the burden of maintaining the clean state of the accumulating chute and the gathering chute in the lower tablet collecting mechanism.

More specifically, the accumulating chute support member comprises a pair of supporting structures, the pair of supporting structures are placed on the left and right with standing at the rear of the manual medicine dispensing device, and a pair of upper end portions of both left and right sides of the accumulating chute rest on upper end portions of the pair of supporting structures.

Further, a recess that can be hung with fingertips is each formed on the side of the pair of upper end portions of the accumulating chute. In this way, it is possible to avoid undesirable upward stretching of members related to the accumulating chute, and to reduce the burden of work for a manual labor when attaching and detaching the accumulating chute.

Furthermore, a gathering chute support member that detachably supports the gathering chute is provided at the rear of the manual medicine dispensing device, and the gathering chute is forwardly drawn out of the housing accompanied by the manual medicine dispensing device which is forwardly drawn out of the housing.

In this way, when the manual medicine dispensing device is forwardly drawn from the housing, the gathering chute located at a rear of the manual medicine dispensing device is forwardly dawn from the housing accompanied by the manual medicine dispensing device, and the gathering chute can be removed from the gathering chute supporting member located at the rear of the manual medicine dispensing device. As a result, the work of cleaning for the tablet falling surface of the gathering chute can be more easily and accurately carried out since being freed from interference with the manual medicine dispensing device and the housing.

The gathering chute is capable to move away from the manual medicine dispensing device to a rear position that the gathering chute can be lifted when the accumulating chute is detached from the accumulating chute support member while the manual medicine dispensing device is forwardly drawn out of the housing, and a backward movement of the gathering chute is restricted when the accumulating chute is attached with the accumulating chute support member even if the manual medicine dispensing device is forwardly drawn out of the housing. In this way, even if the accumulating chute and the gathering chute are made removable in order to facilitate the work of cleaning, dense implementation can be maintained without impairing by limiting the order in which the accumulating chute and the gathering chute are attached and detached. Moreover, when both the accumulating chute and the gathering chute are attached each other, the rearward movement of the gathering chute is restricted by the accumulating chute, thereby there is no need to carry out the work such as fixing screws to completely the control positional relationship between the manual medicine dispensing device and the gathering chute.

The gathering chute biasing means is provided to attempt to pull forward the gathering chute in a state where a backward movement of the gathering chute is restricted since the accumulating chute is attached with the accumulating chute support member. In this way, when the accumulating chute normally attempts to attach to the accumulating chute support member after the gathering chute is manually moved gently to the manual medicine dispensing device in front to make space at a rear part of the gathering chute. When the gathering chute approaches the manual dispensing device in front, the gathering chute is drawn toward the manual medicine dispensing device by the gathering chute biasing means, and thereby is positioned in contact with a suitable member. As a result, the relative position between the gathering chute and the manual medicine dispensing device is determined and stabilized, and the work of mounting the accumulating chute on the accumulating chute support member can be smoothly carried out since the gathering chute does not get in the way. Furthermore, even if the accumulating chute has moved away from the manual medicine dispensing device to the rear due to excess force and inertia, when the manual medicine dispensing device is moved backward and placed inside the housing, the relative positions of the gathering chute and the manual medicine dispensing device quickly return to the original positions since the separation distance is restricted to a small amount within the effect of the gathering chute biasing means. Therefore, even if the work of fixing the position of the gathering chute is simplified, there is an advantage that the gathering chute continues to remain at an appropriate position.

In addition, a handle member on which the fingertips can be hung is attached to an upper end surface of the gathering chute. In this way, when attaching and detaching the gathering chute, the work of attaching and detaching the gathering chute, which is located deep in the intermediate space between the manual medicine dispensing device and the housing and is performed by looking directly down from directly above, can be easily and quickly carried out.

The medicine dispensing apparatus according to the present invention, further may comprise a plurality of single-row reserving mechanism provided to lower end portions of the plurality of tablet feeder storage portions, which temporarily reserve the tablets fallen from the upper tablet collecting mechanisms and then to release the tablets, and a multi-row simultaneous driving mechanism that is provided deep inside the housing and operates the plurality of single-row reserving mechanisms at the same time to discharge the tablets all at once. In this case, the single-row reserving mechanism and the multi-row simultaneous driving mechanism can be separated from or engaged with each other in accordance with the forward and backward movement of the single-row reserving mechanism that occurs when the tablet feeder storage portion corresponding to the single-row reserving mechanism is taken in and out of the housing. In addition, it is preferable that a leftmost single-row reserving mechanism located at the leftmost position in the housing among the plurality of single-row reserving mechanisms includes a left side non-swinging member having a right slope that looks diagonally upward to the right and a right side swinging member facing the non-swinging member, and a tablet falling path with a lower constriction structure is formed between the non-swinging member and the swinging member. Furthermore, it is preferable that a rightmost single-row reserving mechanism located at the rightmost position in the housing among the plurality of single-row reserving mechanisms includes a right side non-swinging member having a left slope that looks diagonally upward to the left and a left side swinging member facing the non-swinging member, and a tablet falling path with a lower constriction is formed between the non-swinging member and the swinging member.

In such the medicine dispensing apparatus, most of the tablets discharged from the leftmost single-row reserving mechanism fall diagonally downward to the right due to strong influence of the right slope of the left non-swinging member. The left side of the tablet falling path of the lower tablet collecting mechanism located at the falling destination is tilted diagonally from the upper left to the lower right in order to collect the tablets, so that the falling tablets do not receive a strong impact, and smoothly and quickly go into the lower tablet collecting mechanism. Similarly, most of the tablets discharged from the rightmost single-row reserving mechanism fall diagonally downward to the left due to strong influence of the left slope of the right non-swinging member. The right side of the tablet falling path of the lower tablet collecting mechanism located at the falling destination is tilted diagonally from the upper right to the lower left in order to collect the tablets, so that the falling tablets do not receive a strong impact, and smoothly and quickly go into the lower tablet collecting mechanism. In this way, in order to collect falling tablets performed by the fixed chute that occupies the upper part of the lower tablet collecting mechanism, the single-row reserving mechanisms located at both the left end and the right end directly above the fixed chute are constructed so that the tablets released from the single-row reserving mechanisms at both the left end and the right end fall toward the center. According to the above construction, undesirable impact on falling tablets is reduced and undesired variations in tablet falling speed are reduced. As the results, variations in the amount of dust generated and the tablet falling speed can be suppressed, thereby not only increasing the resistance to staining but also shortening the tablet collecting time.

It is preferable that the multi-row simultaneous driving mechanism includes a left drive source that drives a member including the leftmost single-row reserving mechanism, and a right drive source that drives a member including the right single-row reserving mechanism. In this way, since the multi-row simultaneous driving mechanism has a plurality of sources, and the leftmost single-row reserving mechanism and the rightmost single-row reserving mechanism are driven individually, the multiple single-row reserving mechanisms with different swing directions can be driven precisely and easily.

In addition, it is also preferable that the leftmost single-row reserving mechanism and the rightmost single-row reserving mechanism share a driving source for rotational movement, and that a rotation reversal mechanism reversing the direction of rotational motion is provided in either a left transmission mechanism between the drive source and the leftmost single-row reserving mechanism or a right transmission mechanism between the drive source and the rightmost single-row reserving mechanism. In this way, the leftmost single-row reserving mechanism and the rightmost single-row reserving mechanism can share the one rotational drive source by incorporating the rotation reversal mechanism into either the right transmission mechanism or the left transmission mechanism. As a result, an increase in the number of driving sources can be suppressed.

Further, it is preferable that the multi-row simultaneous driving mechanism includes an electric motor as a drive source and an origin sensor that detects a rotation stop position of the output shaft of the electric motor, and is configured to stop rotation of the output shaft of the electric motor when the origin sensor detects that the single-row reserving mechanisms and the multi-row simultaneous driving mechanism are separated. In this way, accurate separation between each of the single-row reserving mechanisms and the multi-row simultaneous driving mechanism is appropriately and reliably ensured when none of the single-row reserving mechanisms is driven. As a result, even if the single-row reserving mechanism is installed in the lower end of the upper tablet feeder storage portion instead of around the upper end of the lower tablet collecting mechanism where the multi-row simultaneous driving mechanism is installed, in order to flatten the area around the upper end of the lower tablet collecting mechanism, the necessary separated state is automatically ensured, when a separate state is required for the drawer of the tablet feeder storage portion, etc. In addition, if the single-row reserving mechanisms and the multi-row simultaneous driving mechanism are always in contact with each other when the single-row reserving mechanisms are pushed into the medicine storage together with the tablet feeder storage portions, fine powder tends to be generated due to friction caused by slight vibrations of any member at the contact portion, but if the above-mentioned configuration is adopted, the contact time is restricted, so that there is less contamination due to fine powder.

BRIEF DESCRIPTION OF THE DRAWINGS

FIG. 1(A) illustrates a front view of the structure of a medicine dispensing apparatus for Example 1 of the present invention, while

FIGS. 10(A) and 10(B) illustrate the structure of the medicine dispensing apparatus regarding Example 2 of the present invention wherein FIG. 10(A) is a front view and FIG. 10(B) is an E-E cross sectional view.

FIGS. 1(A) to 9(C) are used to explain the example 1, and FIGS. 10(A) to 11 are used to explain the example 2.

DETAILED DESCRIPTION OF THE INVENTION

Description of the Embodiments

The medicine dispensing apparatus according to the embodiments of the present invention will be described below with reference to specific examples 1 and 2 for implementing the apparatus.

Figure 11:
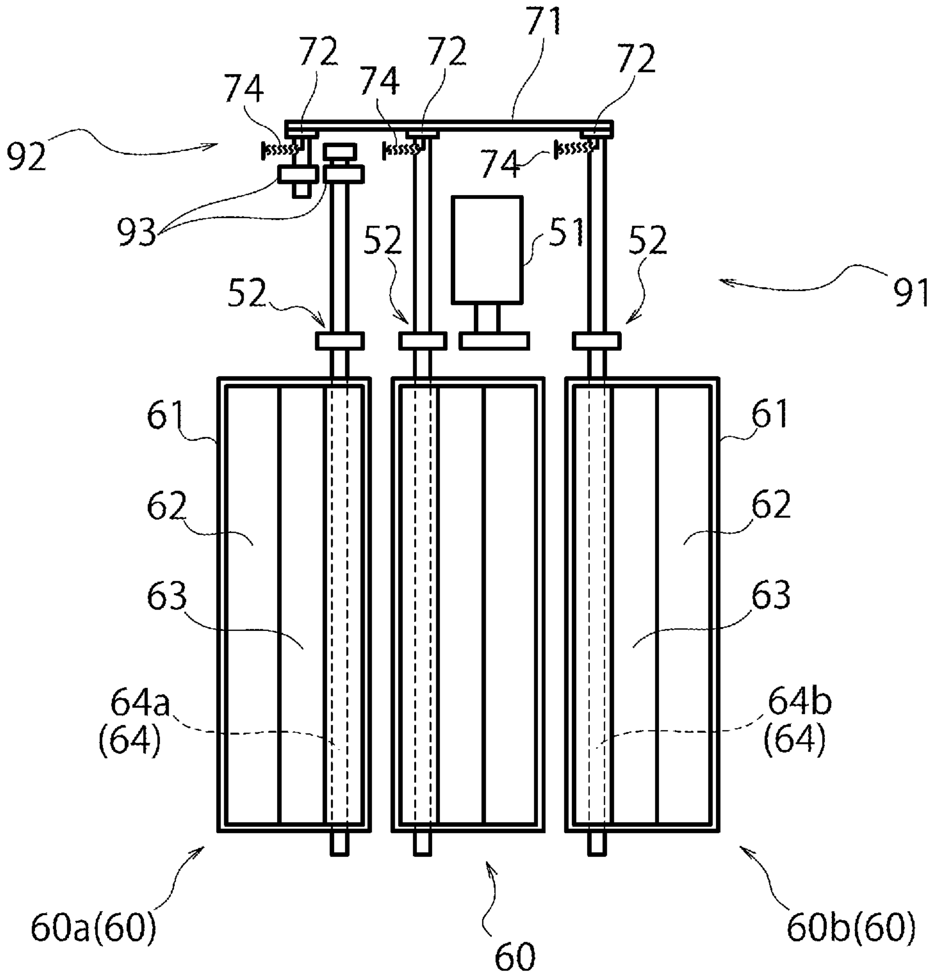
FIG. 11 illustrates a plane view of the multi-row temporary reserving mechanism, the driving mechanism, and the transmission link mechanism.

FIGS. 1 to 9 are used to explain the example 1, and FIGS. 10 to 11 are used to explain the example 2.

For the sake of clarity, fasteners such as bolts, connectors such as hinges, transmission members such as gears, electric circuits such as motor drivers, electronic circuits such as controllers, etc. in FIGS. 1 to 11 are omitted, and only those components necessary for explaining the invention and those components related to the invention are illustrated.

EXAMPLE 1

The specific configuration of Example 1 of the medicine dispensing apparatus of the present invention will be described with reference to the drawings.

Figure 1A:
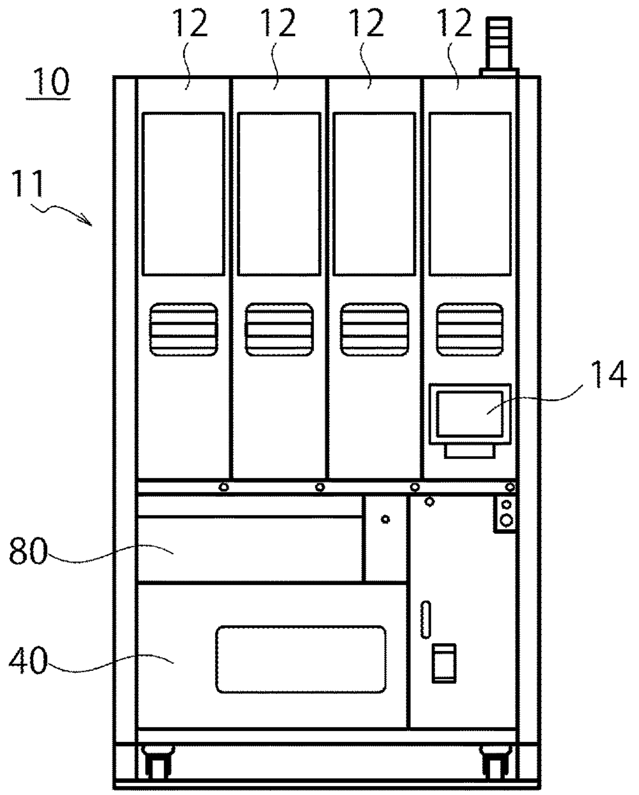
Figure 1B:
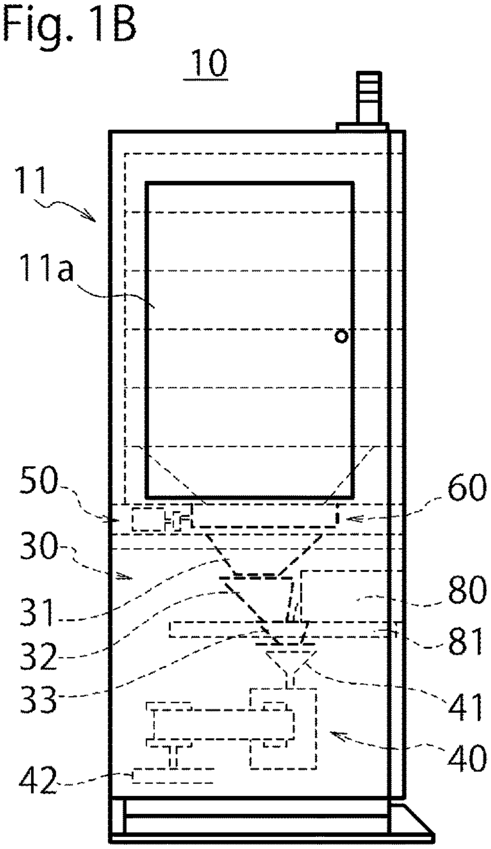
FIGS. 1(B)-1(D) illustrates a left side view.
Figure 1C:
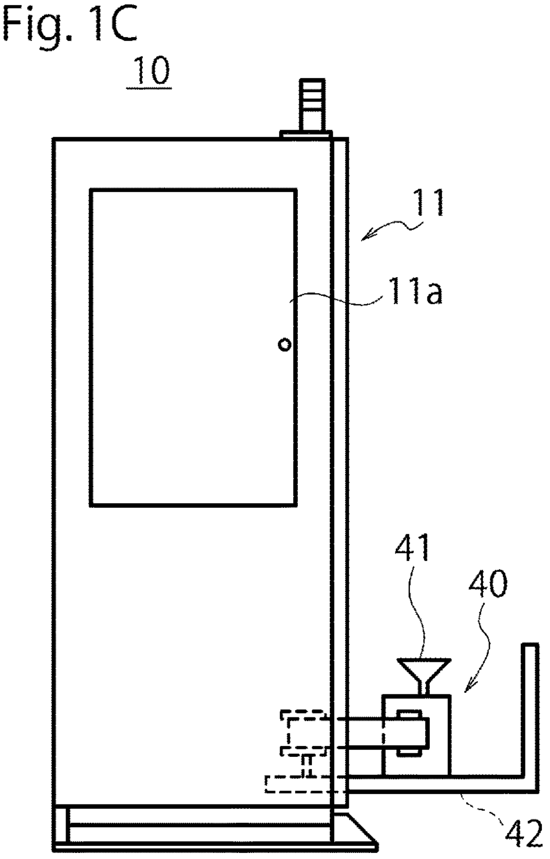
Figure 1D:
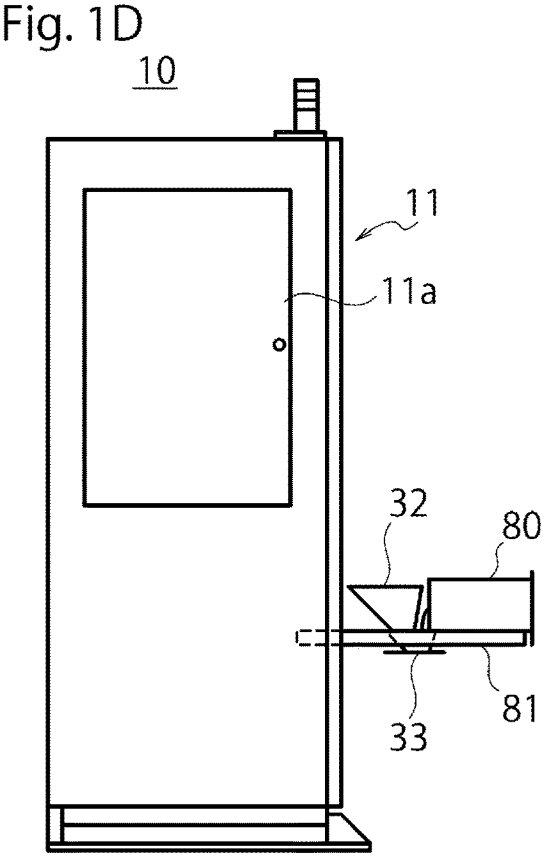

FIGS. 1(A)-1(D) illustrate the overall structure of the medicine dispensing apparatus 10 according to the Example 1, in which FIG. 1(A) is a front view, FIG. 1(B) is a left side view, FIG. 1(C) is a left side view of the medicine dispensing apparatus 10 with a packing device 40 pulled out, and FIG. 1(D) is a left side view of the medicine dispensing apparatus 10 with a manual medicine dispensing device 80 pulled out.

Figures 2A, 2B, 2C, 2D:
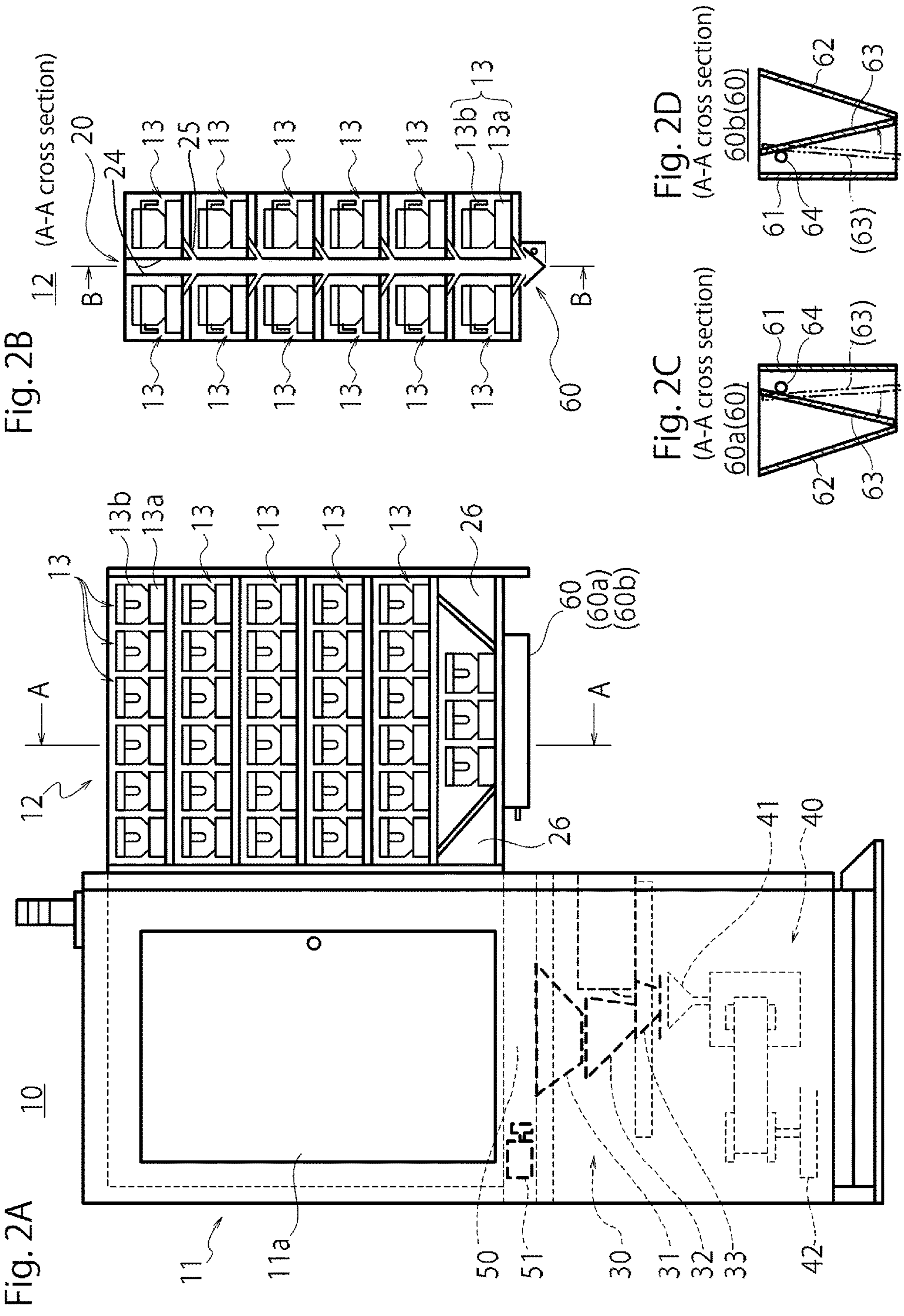
FIG. 2(A) illustrates a left side view of the medicine dispensing apparatus with a tablet feeder storage portion pulled out.
FIG. 2(B) is an A-A cross sectional view of the tablet feeder storage portion, and each of FIGS. 2(C) and 2(D) is an A-A cross sectional view of a temporary reserving mechanism.

FIG. 2(A) illustrates a left side view of the medicine dispensing apparatus 10 with a tablet feeder storage portion 12 pulled out from a housing 11 of a medicine storage, and FIG. 2(B) illustrates an A-A cross sectional view of the tablet feeder storage portion 12. In addition, FIG. 2(C) illustrates an A-A cross sectional view of a leftmost single-row reserving mechanism 60*a* (a temporary storage mechanism 60, a single-row reserving mechanism) located at a leftmost position in the housing 11 of the medicine storage, and FIG. 2(D) illustrates an A-A cross sectional view of a rightmost single-row reserving mechanism 60*b* (the temporary storage mechanism 60, the single-row reserving mechanism) located at a rightmost position in the housing 11 of the medicine storage. Each of FIG. 2(C) and FIG. 2(D) illustrates that the mechanism 60 (the single-row reserving mechanism) is closed.

Figures 3A, 3B, 3C, 3D:
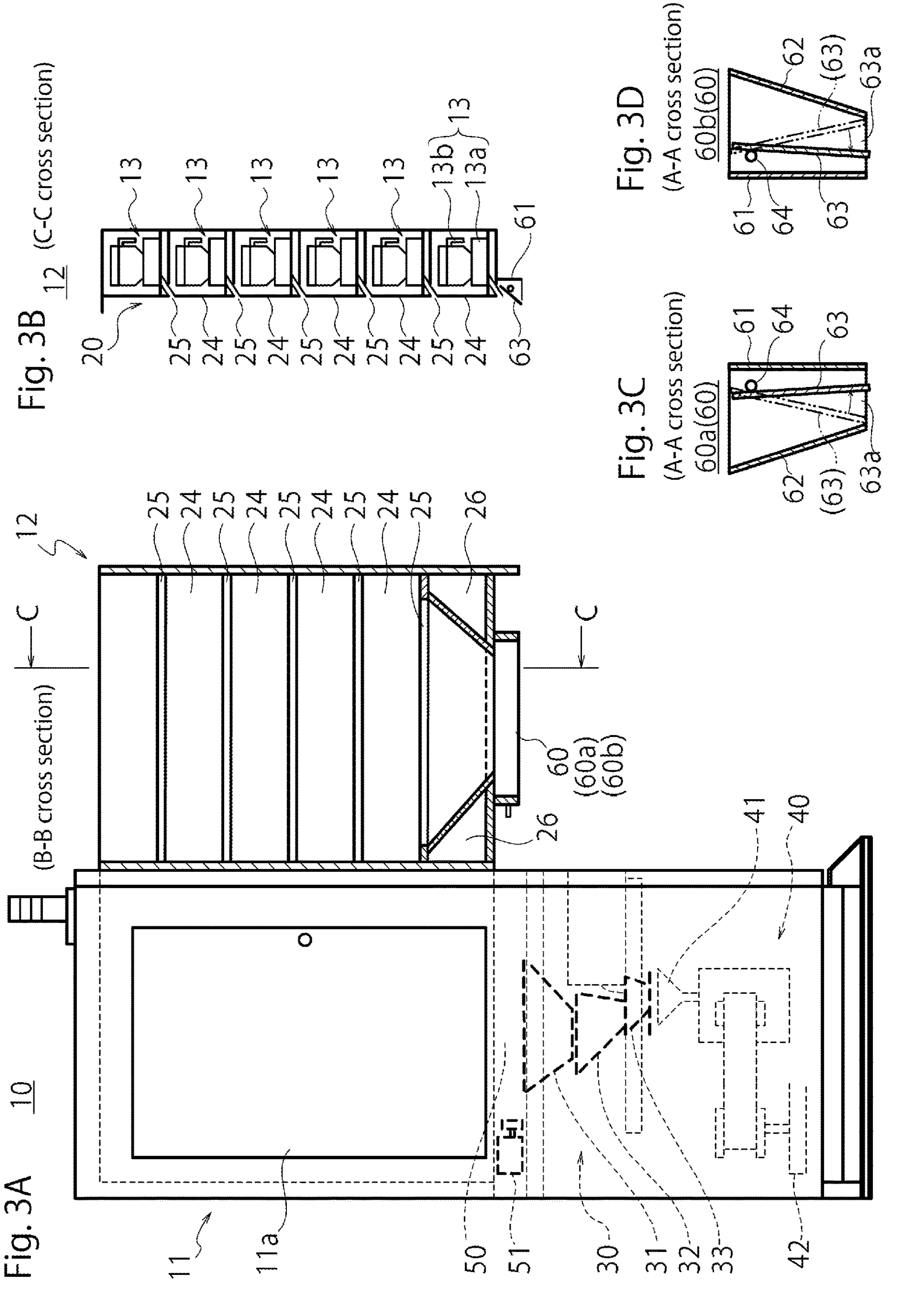
FIG. 3(A) illustrates a composite view of the left side view of the medicine dispensing apparatus and a B-B cross sectional view of the tablet feeder storage portion pulled out from the medicine dispensing apparatus.
FIG. 3(B) is a C-C cross sectional view of the B-B cross section of the tablet feeder storage portion, and each of FIG. 3(C) and 3(D) is the A-A cross sectional view of the temporary reserving mechanism.

FIG. 3(A) illustrates a composite view of a left side view of the medicine dispensing apparatus 10 and a B-B cross sectional view (see FIG. 2(B)) of the tablet feeder storage portion 12 pulled out from the housing 11 of the medicine storage. Similarly, FIG. 3(B) illustrates a C-C cross sectional view of the B-B cross section of the tablet feeder storage 12. Further, FIG. 3(C) illustrates an A-A cross sectional view of the leftmost single-row reserving mechanism 60*a* (the temporary reserving mechanism 60, the single-row reserving mechanism) located at the leftmost position in the housing 11 of the medicine storage, and FIG. 3(D) illustrates an A-A cross sectional view of the rightmost single-row reserving mechanism 60*b* (the temporary reserving mechanism 60, the single-row reserving mechanism) located at the rightmost position in the housing 11 of the medicine storage. Each of drawings of the above-referenced FIG. 3(C) and FIG. 3(D) illustrates that the temporary reserving mechanism 60 (the single-row reserving mechanism) is opened.

Figure 4A:
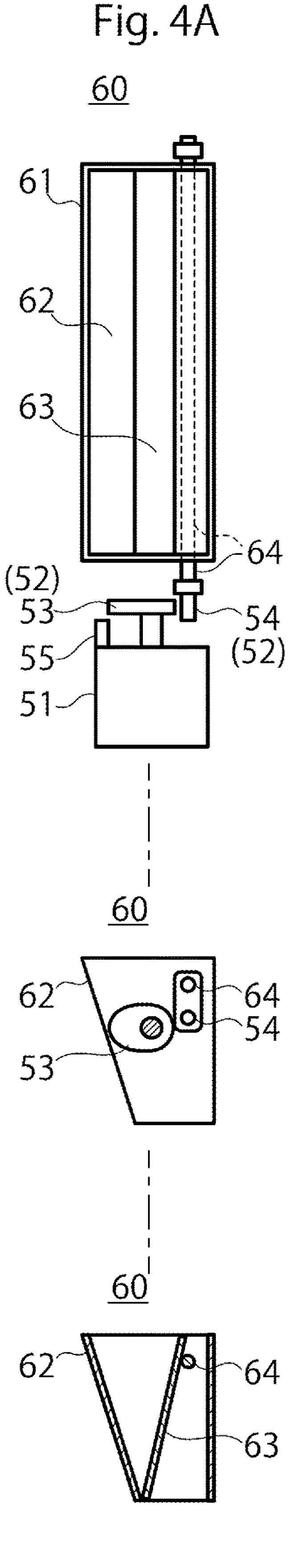
FIGS. 4(A) to 4(C) is a plane view, a front view, and a longitudinal sectional view of a single-row temporary reserving mechanism and a driving mechanism of the single-row temporary reserving mechanism.
Figure 4B:
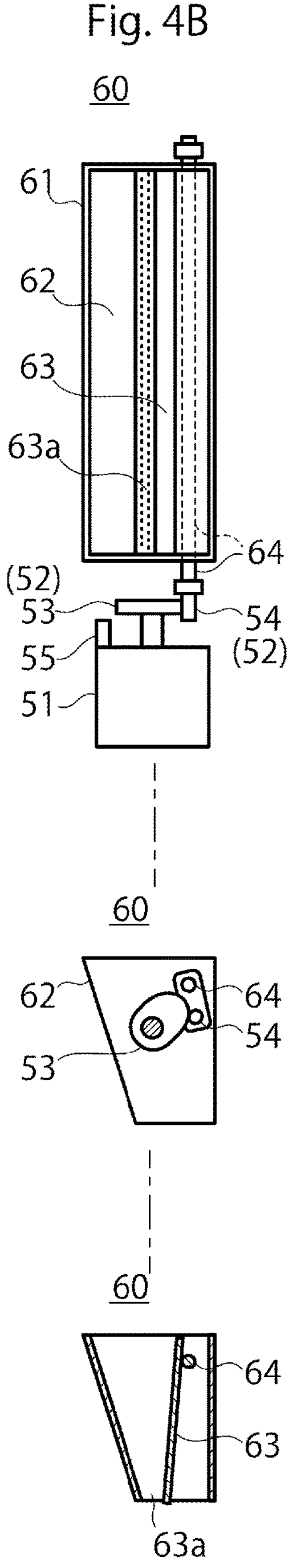
Figure 4C:
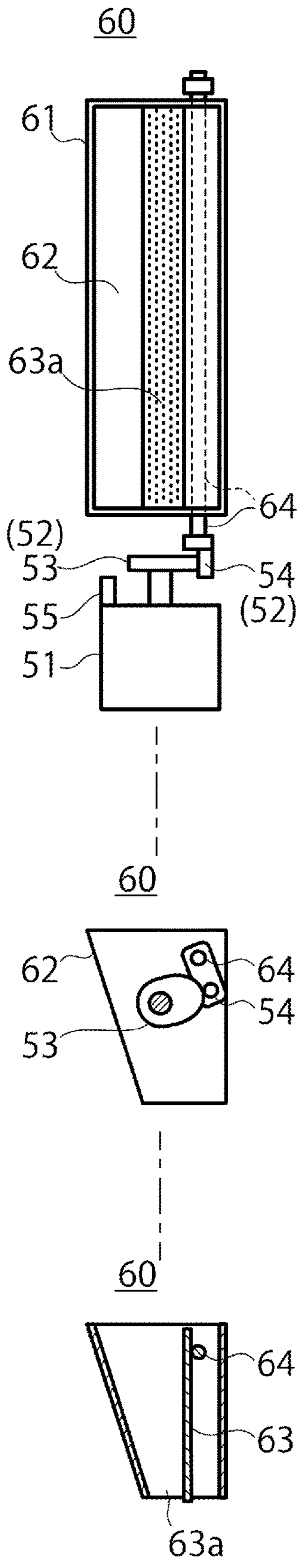

Each of FIGS. 4(A) to 4(C) illustrates the set of a plane view, a front view and a vertical cross sectional view in different operating states of the single-row temporary reserving mechanism 60 and driving mechanisms 51 to 55.

Figure 5A:
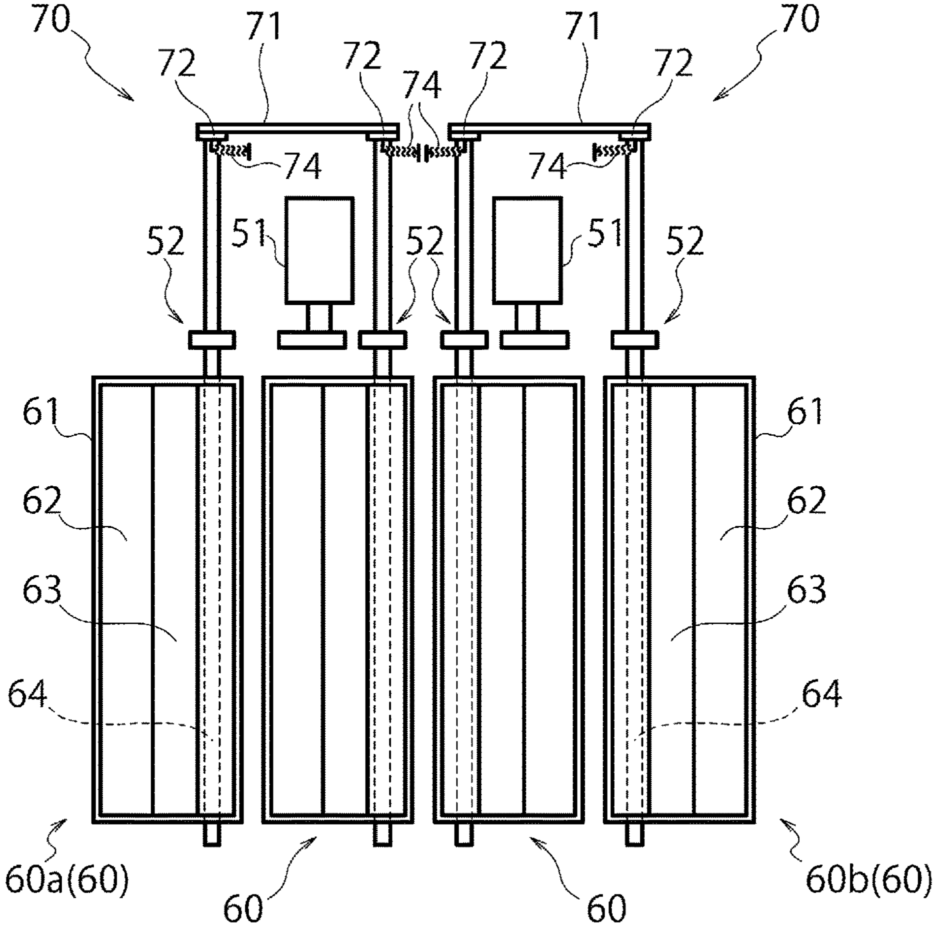
FIG. 5(A) is a plane view of a multi-row temporary reserving mechanism, a driving mechanism of the multi-row temporary reserving mechanism, and a transmission link mechanism, and each of FIGS. 5(B) and 5(C) is a front view of the link mechanism.
Figure 5B:
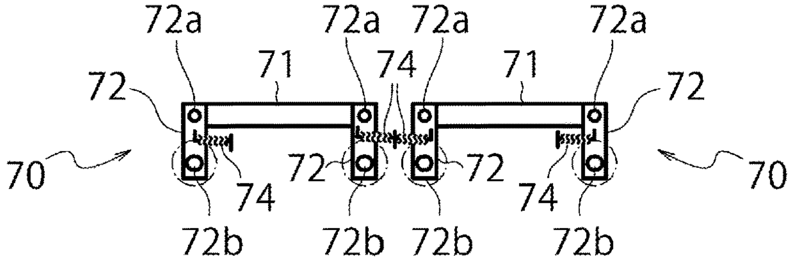
Figure 5C:
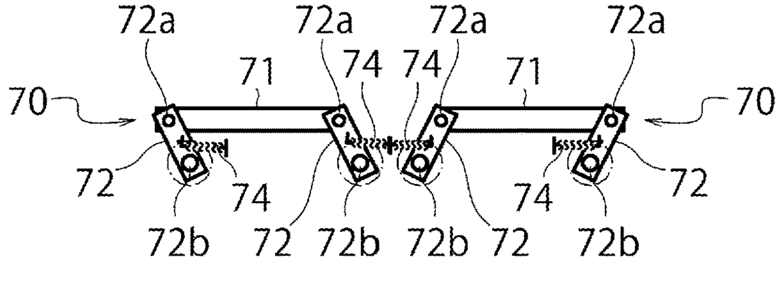

FIG. 5(A) illustrates a plane view of the multi-row temporary reserving mechanisms 60, the multi-row simultaneous driving mechanisms 51 to 55 that simultaneously drive the multi-row simultaneous driving mechanisms, and transmission link mechanisms 70. Both FIG. 5(B) and FIG. 5(C) illustrate front views of the link mechanisms 70, of FIG. 5(B) illustrates the operating state when the temporary reserving mechanisms 60 (the single-row reserving mechanism) are closed, and FIG. 5(C) illustrates the operating state when the temporary reserving mechanisms 60 (the single-row reserving mechanism) is opened.

Figure 6A:
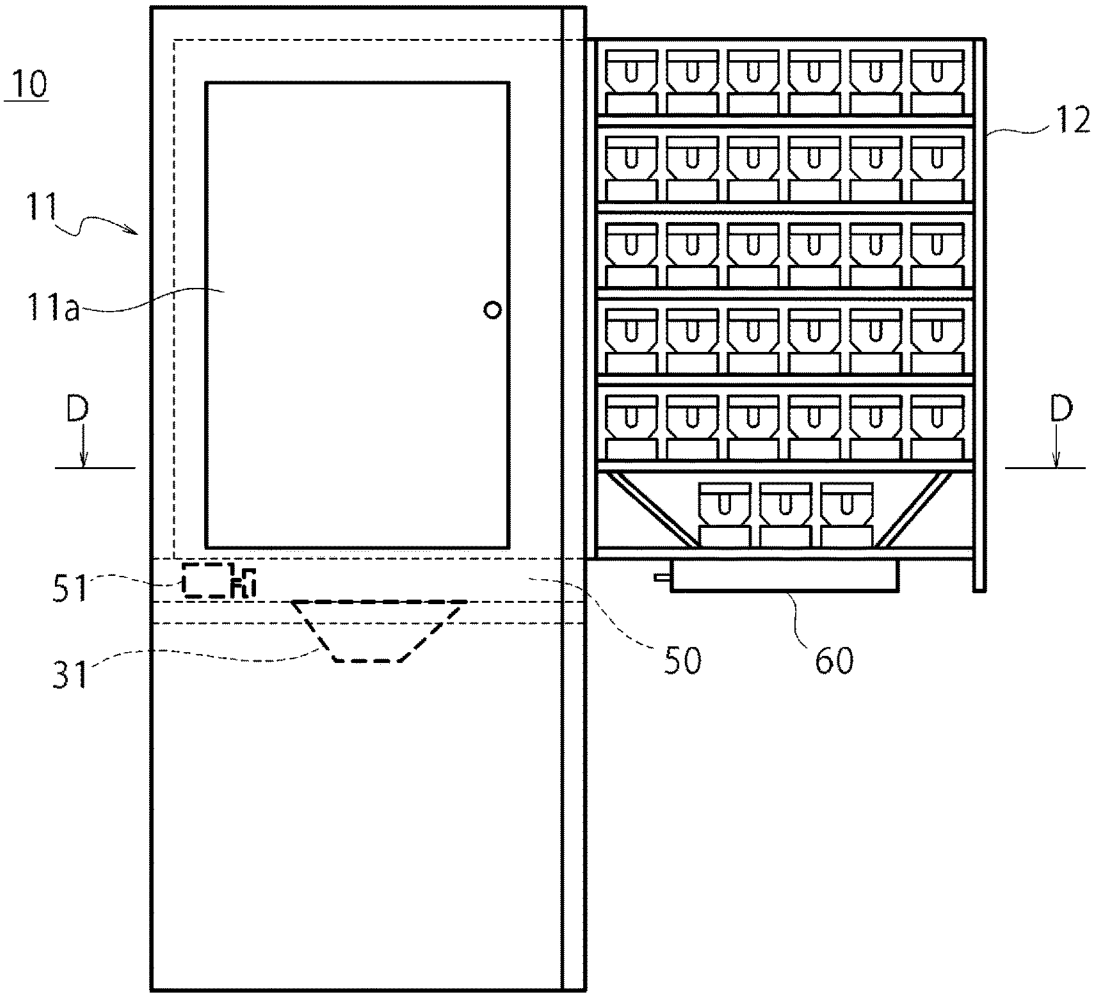
FIG. 6(A) is a left side view of the medicine dispensing apparatus with the tablet feeder storage portion pulled out.
Figure 6B:
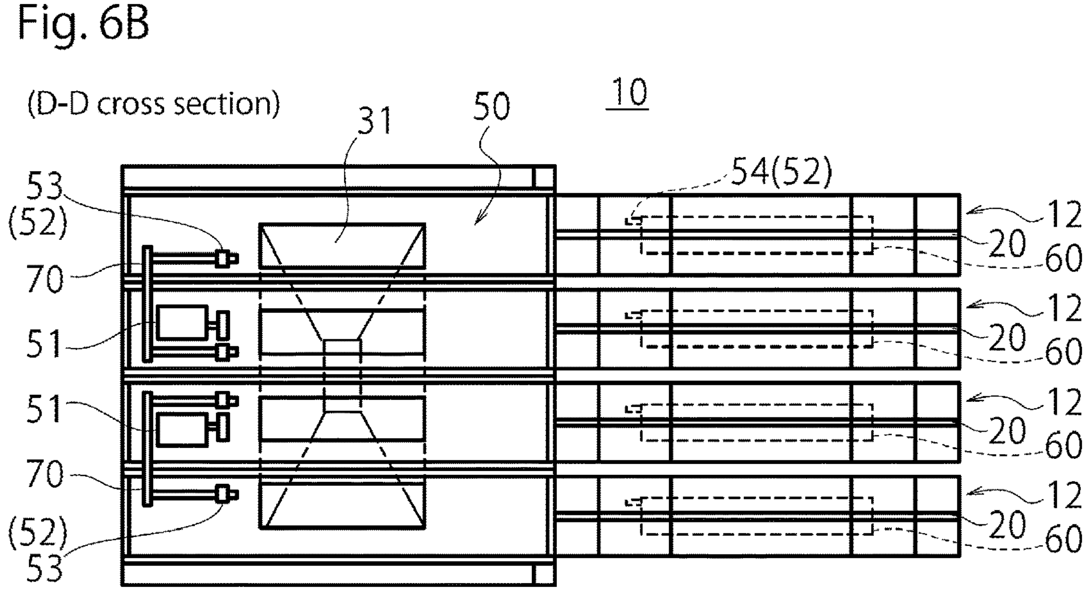
FIG. 6(B) is a D-D cross-sectional view of the medicine dispensing apparatus.

FIG. 6(A) illustrates a left side view of the medicine dispensing apparatus 10 with the tablet feeder storage portion 12 pulled out from the housing 11 of the medicine storage, and FIG. 6(B) illustrates a D-D cross sectional view of the left side view illustrated in FIG. 6(A) and further illustrates the arrangement states of a fixed chute 31 (a first falling collection section) in the temporary reserving mechanism multi-row storage portion 50.

Figure 7B:
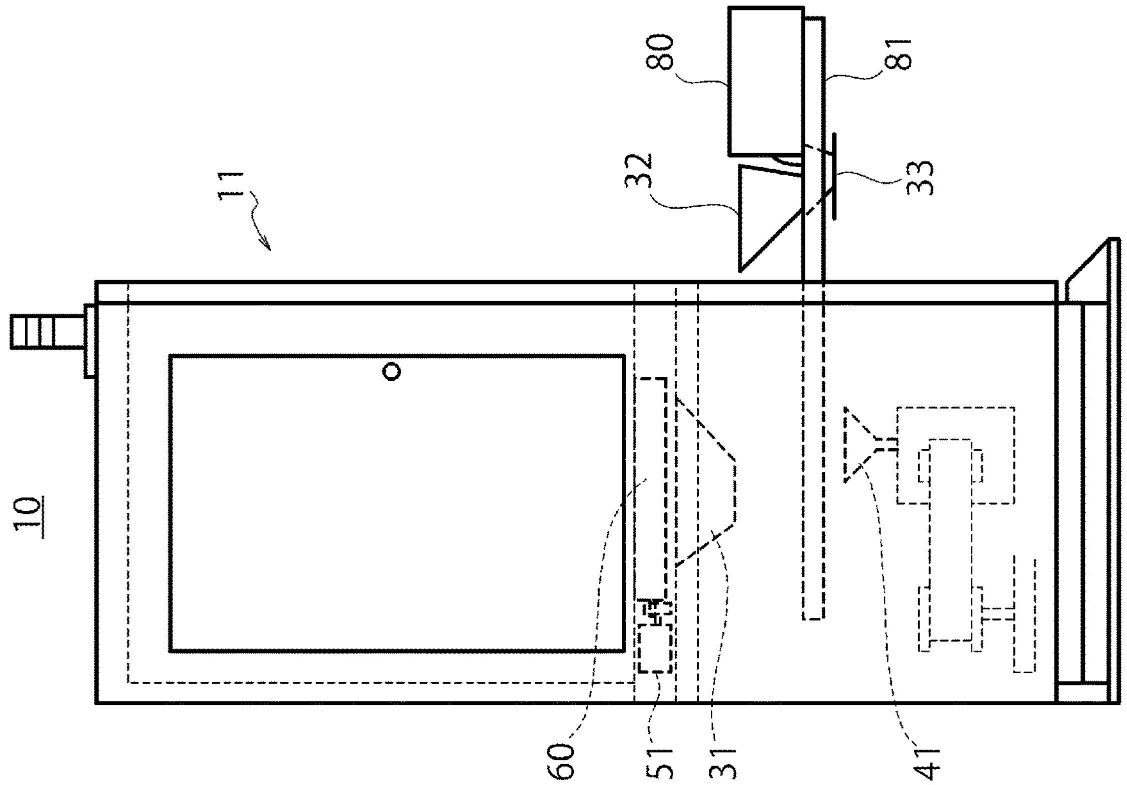
FIG. 7(B) is a left side view of the medicine dispensing apparatus with the manual medicine dispensing device pulled out from the housing.
Figure 7A:
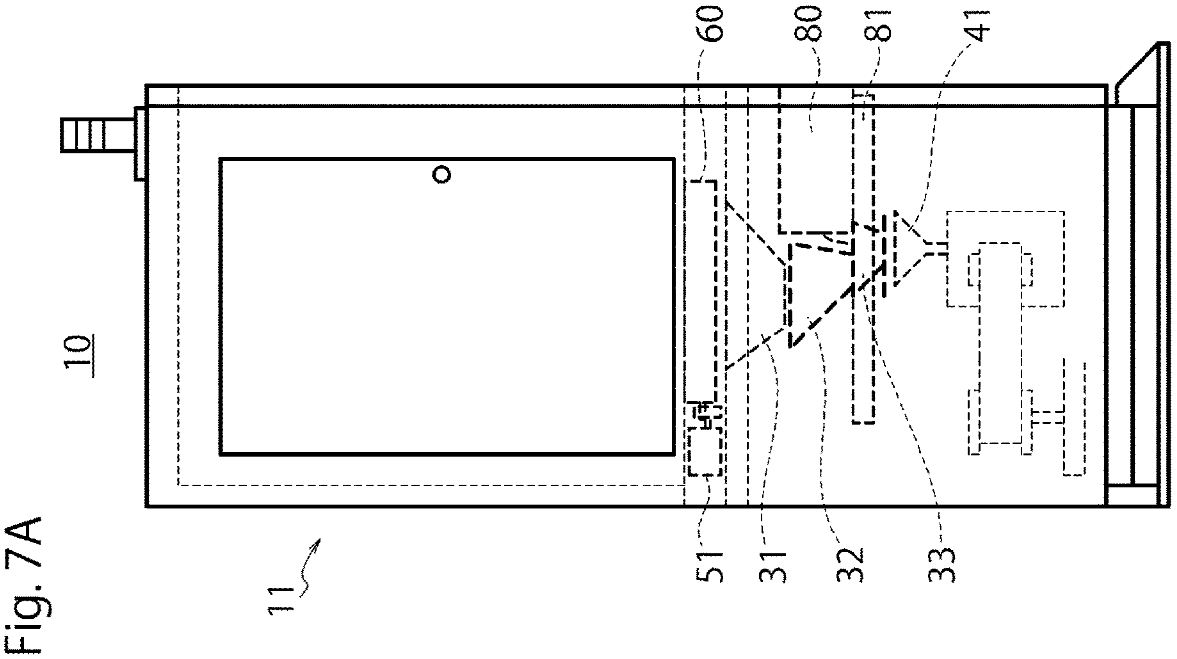
FIG. 7(A) is a left side view of the medicine dispensing apparatus with a manual medicine dispensing device etc. stored in a housing.

FIG. 7(A) illustrates a left side view of the medicine dispensing apparatus 10 in which the tablet feeder storage portion 12, a manual medicine dispensing device 80, and a packing device 40 are installed in the housing, and FIG. 7(B) illustrates a left side view of the medicine dispensing apparatus 10 in a state where the manual medicine dispensing device 80 is pulled out from the housing.

Figure 8A:
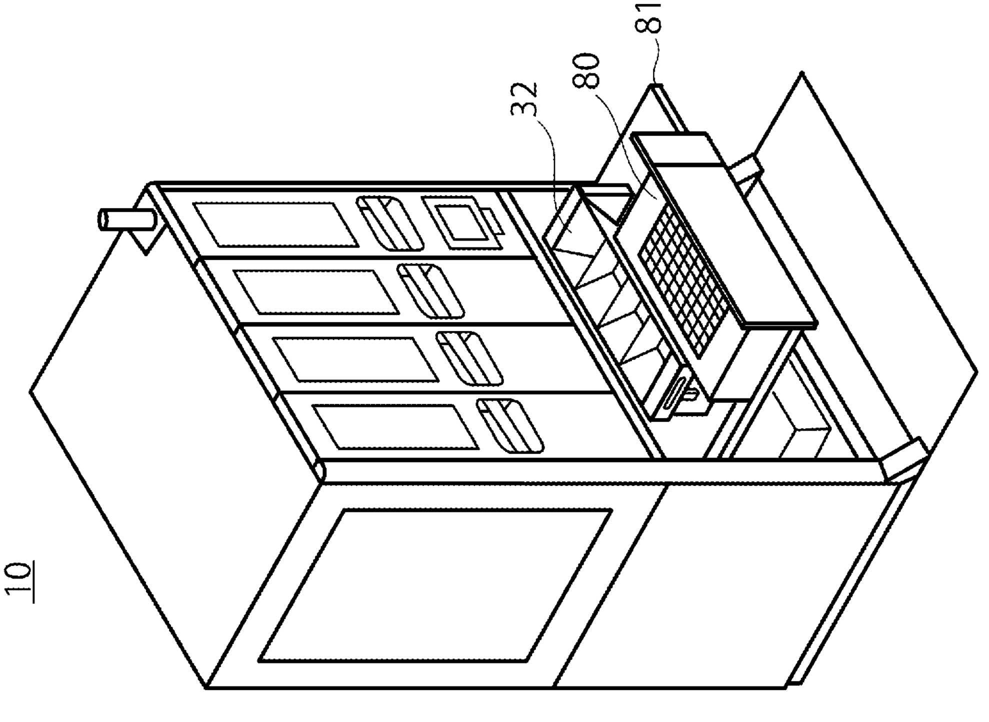
FIG. 8(A) is a perspective view of the medicine dispensing apparatus with an accumulating chute pulled out together with the manual medicine dispensing device.
Figure 8B:
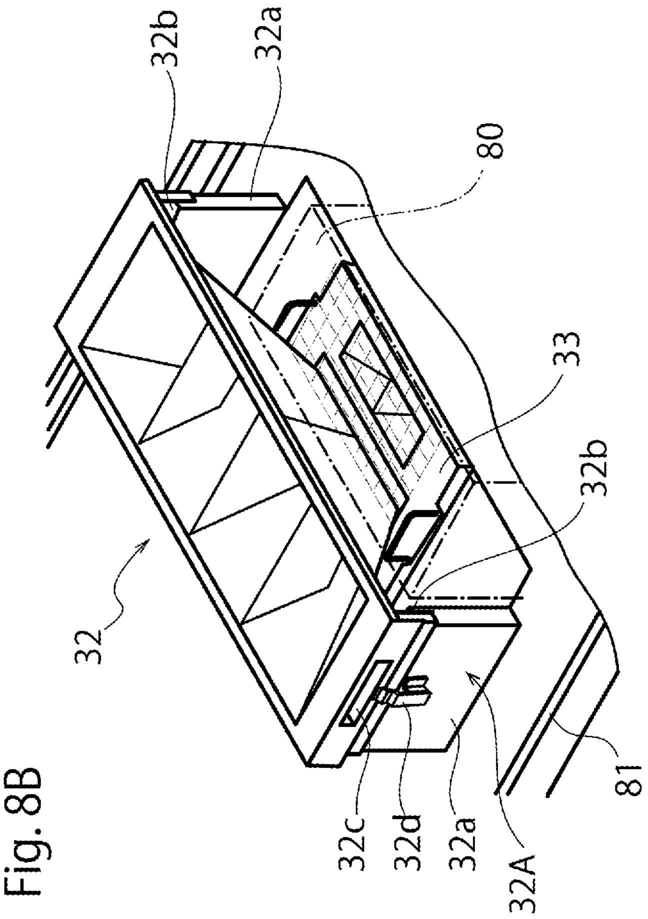
FIG. 8(B) is a perspective view of the accumulating chute and the surroundings of the accumulating chute.
Figure 8C:
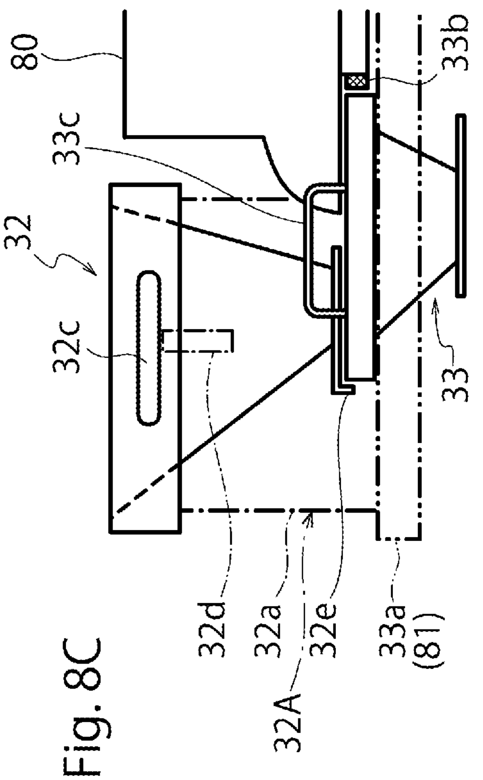
FIG. 8(C) is a perspective view of the accumulating chute, a gathering chute and the manual medicine dispensing device.

FIG. 8(A) illustrates a perspective view of the medicine dispensing apparatus 10 in which an accumulating chute 32 (a second falling collection section) is forwardly drawn from the housing accompanied by the manual medicine dispensing device 80, and FIG. 8(B) illustrates a perspective view of the accumulating chute 32 (the second falling collection section) and its surroundings seen through the manual medicine dispensing device 80, and FIG. 8(C) illustrates a left side view of the accumulating chute 32 (the second falling collection section), a gathering chute 33 (a third falling collection section) and the manual medicine dispensing device 80.

Figure 9B:
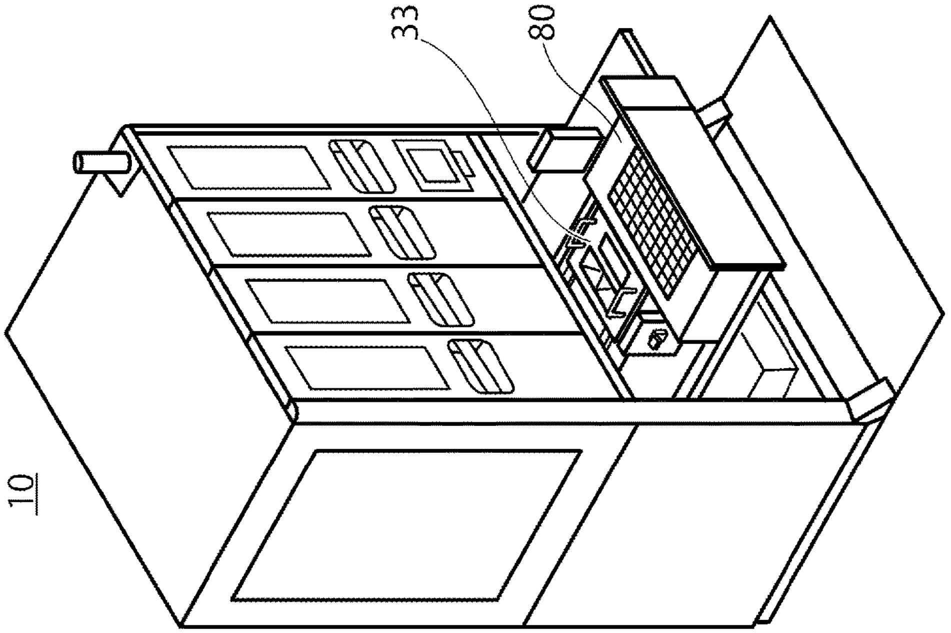
FIG. 9(B) is a perspective view of the medicine dispensing apparatus with the gathering chute moved backward.
Figure 9A:
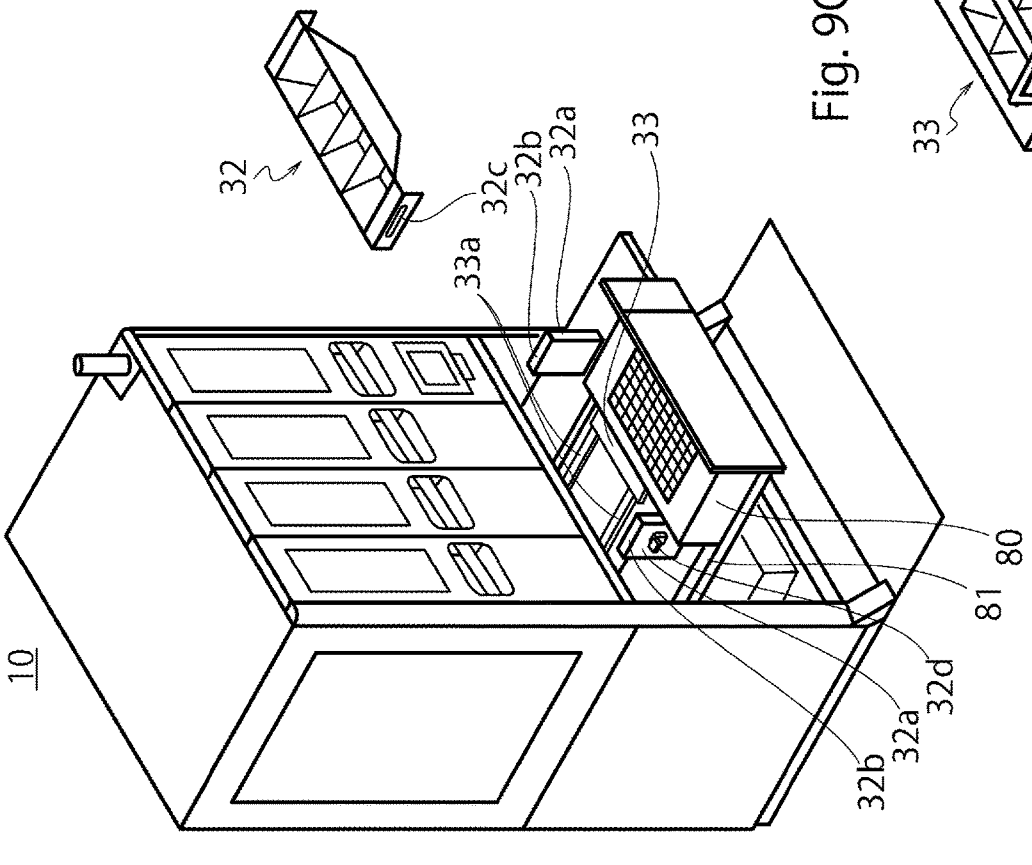
FIG. 9(A) is a perspective view of the medicine dispensing apparatus with the accumulating chute being removed.
Figure 9C:
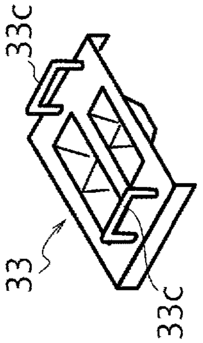
FIG. 9(C) is a perspective view of the gathering chute.

FIG. 9(A) illustrates a perspective view of the medicine dispensing apparatus 10 in the state which the accumulating chute 32 (the second falling collection section) is removed from the drawer mechanism 81, FIG. 9(B) illustrates a perspective view of the medicine dispensing apparatus 10 in the state which the gathering chute 33 (the third falling collection section) is slid to the rear of the manual medicine dispensing device 80, and FIG. 9(C) illustrates a perspective view of the gathering chute 33 (the third falling collection section) alone.

The medicine dispensing apparatus 10 (see FIG. 1) is a partially improved apparatus of the above-mentioned conventional medicine dispensing apparatus. Therefore, similarly to the conventional medicine dispensing apparatuses described above (see also Patent Documents 1 to 5), the medicine storage is provided in the upper part of the housing 11, and a lower medicine collecting mechanism 30 and the packing device 40 are installed in the lower part of the housing 11 in a vertical arrangement. In this example (see FIG. 1(B), FIG. 2(A), and FIG. 3(A)), the temporary reserving mechanism multi-row storage portion 50 is also secured at the uppermost part of the lower part of the housing 11, is located above the lower medicine collecting mechanism 30, and is located directly below the housing 11.

Although not shown in Figs., a control device consisting of a computer for electronic controlling or the like is also mounted at an appropriate location in the housing. A touch panel 14 serving as an operation input section and a display section of the control device is attached to the front surface of one of the tablet feeder storage portions 12 of the medicine dispensing apparatus 10 (see FIG. 1(A)).

In the housing 11, a plurality of (four in this example) tablet feeder storage portions 12 are arranged side by side on the left and right, and each of the tablet feeder storage portions 12 can be individually pushed into the housing 11 (see FIG. 1) or pulled out from the housing 11 toward the front (see FIG. 2(A)) when using as required during medicine replenishment or the work of maintenance. Side plates 11*a* are also provided on both the left and right sides of the housing 11, which can be easily opened and closed by attaching and detaching or swinging (FIGS. 1(A) to 3(D)).

In the tablet feeder storage portion 12, the large number of tablet feeders 13 are mounted. In the illustrated example (see FIGS. 2(A) to 3(D)), the tablet feeders 13 are arranged in 6 rows and 6 stages on the left side (see FIG. 2(A) and FIG. 2(B)) and the tablet feeders 13 are also arranged in 6 rows and 6 stages on the right side (see FIG. 2(B) and FIG. 3(B)). However, regarding the lowest stage, tablet feeder non-installation parts 26 must be secured at the front and rear since the front-to-back length of an upper medicine collecting mechanism 20 must match the front-to-back length of the upper end of the fixed chute 31 (the first falling object collection section). Therefore, only a small number of tablet feeders 13 (three in FIG. 2(A) and FIG. 3(A)) are provided.

The tablet feeder 13 (see FIG. 2(A) to FIG. 3(D)) is a tablet feeder of a type dedicated to specific tablets with a removable cassette. The tablet feeder 13 comprises a base part 13*a* (driving part and discharging part) fixed to the tablet feeder storage portion 12 and a cassette 13*b* (follower part and accommodation part) attached to and detached from the base part 13*a*. Each of tablet feeders 13 randomly stores one of the various tablets in each cassette 13*b*, and sequentially discharges the tablets under the control of the above-mentioned control device. Note that the tablet feeder 13 is not limited to the tablet feeder of the type dedicated to specific tablets with the removable cassette, and some or all of the many tablet feeders 13 may be the tablet feeders of integral and fixed type which can be accommodated a wide variety of tablets (for example, see, Japanese Patent Application Laid-Open No. 2021-029378).

In short, the tablet feeder 13 may be of any type as long as it can accommodate the large number of medicines at once and also can sequentially discharge the stored medicines one by one under the control of the above-mentioned control device.

Note that dispensing instructions or the like to the control device can be given via communication from a dispensing server (not shown) or the like, or can also be given manually via the touch panel 14. The touch panel 14 also displays the operating status of the medicine dispensing apparatus 10, information for the dispensing operator, etc. under the control of the control device.

Further, as shown in FIG. 2(B), the upper medicine collecting mechanism 20 having sliding plates 24 for tablet guide path and drop openings 25 for tablet guide path is arranged between the left tablet feeders 13 and right tablet feeders 13. As shown in FIG. 2(B), FIG. 3(A) and FIG. 3(B), the upper medicine collecting mechanism 20 has a box shape with thin left and right thickness, and is incorporated into each tablet feeder storage 12 one by one. The upper medicine collecting mechanism 20 is configured so that the tablets discharged from the tablet feeders 13 aligned on the left and right are received, though the drop opening 25 for the tablet guide path, into the hollow space between the left sliding plate 24 for tablet guide path and the right sliding plate 24 for tablet guide path, and the tablets are guided downward and are dropped downwards. All the tablets discharged from the tablet feeders 13 are entered into the temporary reserving mechanism 60 being in a closed state (described later) and are temporarily stored in the temporary reserving mechanism 60 (see FIG. 2(C) and FIG. 2(D)).

Then the temporary reserving mechanism 60 is opened to drop the all tablets downwards (see FIG. 3(C) and FIG. 3(D)).

The lower medicine collecting mechanism 30 (see FIG. 1(B), FIG. 2(A), FIG. 3(A), FIG. 6(A), FIG. 6(B), FIG. 7(A), and FIG. 7(B)) is located below the plurality of tablet feeder storage portions 12 within the housing 11. Then, the lower medicine collecting mechanism 30 receives and collects the medicines which are dropped from the large number of tablet feeders 13 mounted in the plurality of tablet feeder storage portions 12, and are passed through any one of the plurality of upper medicine collecting mechanisms 20, and are further passed through any one of the plurality of temporary reserving mechanisms 60. The lower medicine collecting mechanism 30 is then for feeding the collected tablets into the lower packing device 40. In this configuration, there is a funnel-shaped member with upper and lower three stages, which comprises, the fixed chute 31, the accumulating chute 32 and the gathering chute 33, as the main components.

The fixed chute 31 (the first falling object collection section) is located at the upper stage and is a larger vertical cylindrical member with a lower constriction structure and brings the fallen medicines from the temporary reserving mechanism 60 slightly toward the center.

The accumulating chute 32 (the second falling object collection section) is a medium size vertical cylindrical member with a lower construction structure and is located at the middle stage. The accumulating chute 32 receives the medicines that has fallen from the fixed chute 31 (the first falling object collection section), collects the medicines in the center, and then releases the medicines downward.

The gathering chute 33 (the third falling object collection section) is a small vertical cylindrical member with a lower construction structure and is located at the lower stage. The gathering chute 33 receives the medicines that have fallen from the accumulating chute 32 (the second falling object collection section) in addition to the medicines that have been discharged and fallen from the manual medicine dispensing device 80, further collects the medicines in the center, and then releases the medicines toward the input hopper 41 of the packing device 40.

The packing device 40 (see FIGS. 1(A) to 3(D)) is provided below the lower medicine collecting mechanism 30 described above. The input hopper 41 receives the medicines whose falling position has been narrowed down by the lower medicine collecting mechanism 30. The packing device 40 separately packs the medicines in the input hopper 41 into packing band (not shown) under the control of the control device.

The packing device 40 is configured to be forwardly drawn out of the housing 11 accompanied by the base member 42 which is forwardly drawn out of the housing 11, as same as the conventional medicine dispensing apparatus described above (see FIG. 1(C)).

The manual medicine dispensing device 80 is mounted on a drawer mechanism 81 together with the accumulating chute 32 and the gathering chute 33 (see FIG. 1(B)), and can be forwardly drawn from the housing 11 together with the accumulating chute and the gathering chute (see FIG. 1(D)). The manual medicine dispensing device 80 includes a removable preliminary dispensing cassette or a permanent preliminary dispensing portion, in which the large number of compartments (cells) are arranged in rows and stages. The upper surface of each compartment is opened for medicine injected, and the lower surface of each compartment is made of a shutter for medicine discharged, which opens and closes automatically, so that even if the injection of medicine can be performed manually, the discharging of medicine can be performed automatically. The medicines dropped and discharged from the manual medicine dispensing device 80 in compartments unit by unit is downwardly fallen into the gathering chute 33, so that the medicines are transferred from the tablet feeders 13 into the gathering chute 33 and is merged with the medicines fallen via the above-mentioned collecting mechanism (20, 60, 31, 32).

In this example, the temporary reserving mechanism multi-row storage portion 50 is also secured in the lower portion of the housing that installs the manual medicine dispensing device 80, the lower medicine collecting mechanism 30, etc. (see FIGS. 1(A) to 3(D), and FIGS. 6(A)-6(B)).

The temporary reserving mechanism multi-row storage portion 50 is arranged above the lower medicine collecting mechanism 30 and is located between the upper medicine collecting mechanism 20 and the lower medicine collecting mechanism 30 (see FIG. 2(A) and FIG. 2(B)). Furthermore, the multi-row simultaneous driving mechanisms 51 to 55 and the link mechanisms 70 are fixedly mounted in the rear part of the temporary reserving mechanism multi-row storage portion 50 (see FIGS. 6(A)-6(B)). Further, the upper end of the fixed chute 31 (the first falling object collection section) is fixed to the center of the lower surface of the temporary reserving mechanism storage portion 50 (see FIGS. 6(A)-6(B)). A space is secured in the center portion and the front portion in which the temporary reserving mechanism 60 (the single-row reserving mechanism) can move in and out accompanied by the tablet feeder storage portion 12 which moves in and out from the housing of the medicine storage 11 (see FIG. 1(B) and FIGS. 6(A)-6(B)).

The temporary reserving mechanism 60 (the single-row reserving mechanism) (see FIGS. 2(A) to 6(B)) is attached to each tablet feeder storage portion 12 one by one. The temporary reserving mechanism 60 includes a box frame 61 with an open top being long from front to back, an inclined side plate 62 on one side of the box frame, an opening/closing member 63 (a swinging plate, a swinging member) that faces the inclined side plate 62 and opens and closes the lower surface of the box frame, and a support shaft 64 (a transmission shaft) connected the upper portion of the opening/closing member 63.

When the support shaft 64 is rotated within a restricted range, the temporary reserving mechanism 60 (the single-row reserving mechanism) swings the opening/closing member 63 to close the lower surface of the box frame 61 (see FIG. 2(C), FIG. 2(D) and FIG. 4(A)), and to open the lower surface of the box frame to create the opening 63*a* (the tablet falling path with a lower constriction structure) (see FIG. 4(B)), or further to enlarge the opening 63*a* (see FIG. 3(C), FIG. 3(D), and FIG. 4(C)).

The above-mentioned temporary reserving mechanism 60 (the single-row reserving mechanism) receives the medicines in a closed state and temporarily reserves the medicines when the medicines discharged from the large number of tablet feeders 13 are guided by the upper medicine collecting mechanism 20 located above and fall. Then, the lower surface of the temporary reserving mechanism 60 is opened at an appropriate time to drop all reserved medicines into the lower medicine collecting mechanism 30 through the opening 63*a*. During temporary reserving in the temporary reserving mechanism 60, variations in medicine collecting time due to variations in the discharge timing of each tablet feeder 13, differences in falling path length in each upper medicine collecting mechanism 20, and variations in falling time, etc. are resolved. The medicines all to be included in one package are dropped at ones to the lower medicine collecting mechanism 30, so that the waiting time for loading the packing device 40 is shortened, and the operating speed of packing medicines is increased.

Furthermore, in this temporary reserving mechanism 60 (the single-row reserving mechanism), a cam mechanism 52 consisting of an original node 53 and a follower node 54 are used for an engagement portion of the temporary reserving mechanism 60 and the multi-row simultaneous driving mechanisms 51 to 55 (see FIG. 4(A) to 4(C)) as the corresponding temporary reserving mechanism 60 and the multi-row simultaneous driving mechanisms 51 to 55 are operable to smoothly separate and engage, which are accompanied by the movement back and forth of the temporary reserving mechanism 60 by the movement in and out from the housing 11 of the tablet feeder storage portion 12. The follower node 54 on the driven side of the cam mechanism 52 is attached to the support shaft 64 of the temporary reserving mechanism 60, and the original node 53 on the driving side of the cam mechanism 52 is attached to a rotational driving shaft of the electric motor 51 (a drive source) of the multi-row simultaneous driving mechanisms 51 to 55. In each time when the rotational driving shaft of the electric motor 51 (the drive source) rotates once, the original node 53 and the follower node 54 temporarily change from a separated state to a contacted state, and then return to the separated state.

In the separated state and a non-operating state where the original node 53 and the follower node 54 are separated (see FIG. 4(A)), the closed state is maintained in which the lower end of the opening/closing member 63 contacts with the lower end of the side plate 62 (an inclined side plate, an opposing fixed type/an inclined type non-swinging member) (see also FIG. 2(C) and FIG. 2(D)) and rests by the action of an unillustrated biasing spring or the like.

Therefore, in this closed state, both the side plate 62 and the opening/closing member 63 are inclined toward the opposite side by, for example, several tens of degrees from the vertical, and a tablet reserving space with a vertical section inverted triangular shape is secured between the side plate 62 and the opening/closing member 63.

On the other hand, in the joined/operated state in which the original node 53 is in contact with the follower node 54 and pushes/moves the follower node (see FIG. 4(B) and FIG. 4(C)), the support shaft 64 is rotated by several tens of degrees in a restricted range, and as a result, the opening/closing member 63 swings, and the opening 63*a* temporarily created between the lower end of the side plate 62 and the lower end of the opening 63*a* (see also FIG. 3(C) and FIG. 3(D)).

In this opened state, the upper, middle, and lower portions between the side plate 62 and the opening/closing member 63 are opened, and in particular, the closed lower portion is opened, so that the tablets temporarily stored in the tablet reserving space are fallen at once.

Further, the multi-row simultaneous driving mechanism 51 to 55 (see FIGS. 4(A) to 4(C)) has the origin sensor 55 in which detects the rotation angle (the rotation phase) of the output shaft of the electric motor 51 and the rotation stop position by sensing, for example, the approach and separation of the original node 53. For example, when it is detected that the detection level exceeds a predetermined threshold based on the detection status of the origin sensor 55, motor control is performed to immediately stop driving the electric motor 51. As a result, when the temporary reserving mechanism 60 and the multi-row simultaneous driving mechanisms 51 to 55 are separated, the rotation of the output shaft of the electric motor 51 is stopped. Through this operation, the temporary creation of the opening 63*a* caused by one revolution of the electric motor 51 and the swinging of the opening/closing member 63 (transitioning in FIGS. 4, (A) to (B) to (C) to (A)) can be repeated with high accuracy.

Further, as shown in FIGS. 5(A)-5(C), the link mechanism 70 is interposed between the multi-row simultaneous driving mechanism 51 to 55 and the temporary reserving mechanism 60 to save on the number of electric motors 51.

Specifically (see the left half of FIG. 5(A)), the link mechanism 70 is interposed between the leftmost single-row reserving mechanism 60*a,* which is the leftmost temporary reserving mechanism 60, and the temporary reserving mechanism 60 next to the right of the leftmost single-row reserving mechanism 60*a,* which is located at the middle, and the opening and closing operations of the above-mentioned two reserving mechanisms 60*a* and 60 are driven by the left side electric motor 51.

Further, the left side multi-row simultaneous driving mechanism 51 to 55 are the left side drive source that drives the members including the leftmost single-row reserving mechanism 60*a* (the left side link mechanism 70 and the left end cam mechanism 52).

Moreover (see the right half of FIG. 5(A)), another link mechanism 70 is interposed between the rightmost single-row reserving mechanism 60*b,* which is the rightmost temporary reserving mechanism 60, and the temporary reserving mechanism 60 next to the left of the rightmost single-row reserving mechanism 60*b,* which is located at the middle, and the opening and closing operations of the above-mentioned two reserving mechanisms 60*b* and 60 are driven by the right side another electric motor 51.

Further, the right side multi-row simultaneous driving mechanism 51 to 55 is the right side drive source that drives the members including the rightmost single-row reserving mechanism 60*b* (the right side link mechanism 70 and the right end cam mechanism 52).

Moreover (see the lower half of FIG. 5(A)), the side plate 62, which is a left side non-swinging member having a right slope that looks diagonally upward to the right, and the opening/closing member 63, which is a right side swinging member facing the side plate 62 are provided, respectively, in the leftmost single-row reserving mechanism 60*a* and the temporary reserving mechanism 60 adjacent to the right of the leftmost single-row reserving mechanism 60*a* (see also FIG. 2(C) and FIG. 3(C)). The tablet falling path with a lower constriction structure including the lower end opening 63*a* is formed between the side plate 62 and the opening/closing member 63.

On the other hand (see the lower half of FIG. 5(A)), the side plate 62, which is a right side non-swinging member having a left slope that looks diagonally upward to the left, and the opening/closing member 63, which is a left side swinging member facing the side plate 62 are provided, respectively, in the rightmost single-row reserving mechanism 60*b* and the temporary reserving mechanism 60 adjacent to the left of the rightmost single-row reserving mechanism 60*b* (see also FIG. 2(D) and FIG. 3(D)). The tablet falling path with a lower constriction structure including the lower end opening 63*a* is formed between the side plate 62 and the opening/closing member 63.

The link mechanism 70 (see FIGS. 5(A)-5(C),) is a transmission mechanism for transmitting the rotational movement around the shaft within a restricted angle of the support shaft 64 (transmission shaft) driven by the cam mechanism 52, which coverts one rotational movement of the output shaft of the electric motor 51 into a swinging movement, to the support shaft 64 of the next temporary reserving mechanism 60. The link mechanism 70 is provided in the deep part of the temporary reserving mechanism multi-row reserving portion 50 within the housing 11, and is located behind the plurality of (four in this example) temporary reserving mechanisms 60 (see FIG. 5 (A)).

In this example, a set of link mechanism 70 is provided behind the leftmost single-row reserving mechanism 60*a*, the temporary reserving mechanism 60 on the right of the leftmost single-row reserving mechanism 60*a*, and the left side multi-row simultaneous driving mechanism 51 to 55 that drives the leftmost single-row reserving mechanism 60*a* and the temporary reserving mechanism 60. Another set of link mechanism 70 is provided behind the rightmost single-row reserving mechanism 60*b*, the temporary reserving mechanism 60 adjacent to the left of the rightmost single-row reserving mechanism 60*b*, and the right side multi-row simultaneous driving mechanisms 51 to 55 that drive the rightmost single-row reserving mechanism 60*b* and the temporary reserving mechanism 60.

Each link mechanism 70 (see FIGS. 5(A)-5(C),) includes a horizontally long rod-shaped connecting member 71, a short swinging member 72 arranged one-to-one on the temporary reserving mechanism 60 and a biasing spring 74 arranged one-to-one on each swinging member 72. The swinging end portion 72*a* of the swinging member 72 is connected to the connecting member 71 in a freely rotatable state, and the swinging fulcrum portion 72*b* of the swinging member 72 is connected to a support member (not shown) deep inside the housing (see FIGS. 5(A) and 5 (B)).

Then, when the electric motor 51 makes the follower node 54 swing, the corresponding transmission (support) shaft 64 rotates around the shaft within a restricted range against the reaction force of the biasing spring 74, and the other support shafts 64*a* and 64*b* which can be interlocked with each other via the link mechanism 70 and the cam mechanism 52, also rotate in the same manner accompanied by the corresponding transmission (support) shaft 64 (see FIG. 5(C)). Furthermore, when the rotational drive of the transmission (support) shaft 64 is stopped, all the support shafts 64 including the transmission (support) shaft 64*a* return to the original states due to the biasing force of the biasing spring 74 (see FIG. 5(B)).

Therefore, each time the output shaft of the electric motor 51 rotates once, the cam mechanism 52, the transmission (support) shaft 64*a* and the link mechanism 70 operate, causing all the opening/closing members 63 to swing, and the opening and closing operations are performed by swinging of all the opening/closing members 63 in all the temporary reserving mechanisms 60.

Moreover, the link mechanism 70 is interposed between the left side multi-row simultaneous driving mechanisms 51 to 55 and both the leftmost single-row reserving mechanism 60*a* and the temporary reserving mechanism 60 next to the leftmost single-row reserving mechanism 60*a*, and the other link mechanism 70 is interposed between the right side multi-row simultaneous driving mechanisms 51 to 55 and both the rightmost single-row reserving mechanism 60*b* and the temporary reserving mechanism 60 next to the rightmost single-row reserving mechanism 60*b*, and furthermore, both link mechanisms 70 are made bilaterally symmetrical (see the mechanisms (70, 52, 51, 60*a*, 60) that are continuous from the upper left to the lower left shown in FIG. 5(A) and the mechanisms (70, 52, 51, 60*b*, 60) that are continuous from the upper right to the lower right shown in FIG. 5(A)). With this structure regarding any temporary reserving mechanism 60, the opening/closing member 63 swings the lower end portion of the opening/closing member 63 toward the center from the left and right during the opening operation.

Specifically, when the control device simultaneously operates the left and right electric motors 51, 51 for one rotation, the swinging members 72, 72 of the left side link mechanism 70 move back and forth once to the left together, and the swinging members 72, 72 of the right side link mechanism 70 also move back and forth once to the right together (see the change of state shown in FIG. 4(A), FIG. 5(B) to FIG. 4(C), FIG. 5(C) to FIG. 4(A), FIG. 5(B)). As accompanied by this movement, the leftmost single-row reserving mechanism 60*a* and the temporary reserving mechanism 60 adjacent to the right side of the leftmost single-row reserving mechanism temporarily open from the left to the right center side (see the change of state shown in FIG. 2(C) to FIG. 3(C) to FIG. 2(C)), and the rightmost single-row reserving mechanism 60*b* and the temporary reserving mechanism 60 adjacent to the left side of the rightmost single-row reserving mechanism temporarily open from the left to the right center side (see the change of state shown in FIG. 2(D) to FIG. 3(D) to FIG. 2(D)).

Regarding the lower medicine collecting mechanism 30, it is only stated that the lower medicine collecting mechanism 30 consists of a funnel-shaped member (a lower constriction structure vertical cylindrical member) with three upper and lower stages, such as the fixed chute 31, the accumulating chute 32 and the gathering chute 33, so that details are explained below.

First, the fixed chute 31 in the upper stage is the largest chute. The upper end of the fixed chute 31 is normally fixed to the bottom plate of the temporary reserving mechanism multi-row storage portion 50 (see FIG. 1(B) and FIGS. 6(A)-6(B)), and is located below the plurality of tablet feeder storage portions 12 in the housing 11. When the side plate 11*a* is removed from the housing 11 of the medicine dispensing apparatus 10, the bottom surface of the temporary reserving mechanism multi-row storage portion 50 becomes visible from the side of the housing 11, and accordingly, the inclined inner surface of the fixed chute 31 can be easily viewed diagonally from above (see FIG. 6(B)).

The middle accumulating chute 32 is the chute smaller than the above-described fixed chute 31, and is mounted on the drawer mechanism 81 of the manual medicine dispensing device 80 and is located at the rear of the manual medicine dispensing device 80 (see FIGS. 1(A)-1 (D)). When the manual medicine dispensing device 80 is pushed into the housing 11 (see FIG. 7(A)), the middle accumulating chute 32 is installed inside the housing 11 and is located directly below the fixed chute 31. The middle accumulating chute 32 collects the tablets fallen from the fixed chute 31 and releases the collected tablets toward the accumulating chute 32 (the second falling object collection section). Furthermore, when the manual medicine dispensing device 80 is forwardly drawn from the housing 11, the middle accumulating chute 32 is also forwardly drawn from the housing 11 accompanied by the drawer (see FIG. 7(B)).

The accumulating chute support member 32A that removably supports the accumulating chute 32 is provided upright on the upper surface of the drawer mechanism 81 in order to enable to be accompanied by the action such as forwardly drawing from or pushing into the housing, and also to allow the accumulating chute 32 to be easily and quickly attached and detached when forwardly drawing the accumulating chute 32 from the housing 11 (see FIGS. 8(A)-8(C) and FIG. 9 (A)).

In this example, the accumulating chute support member 32*a* has the structure locating behind the manual medicine dispensing device 80 by separating the pair of support structures 32*a* into left and right parts. In addition (see FIGS. 8(A)-8(C)), the left and right overhangs of the upper end of the accumulating chute 32 (the second falling object collection section) are provided on the pair of upper ends 32*b* of the pair of support structures 32*a* of the accumulating chute support member 32A, and keeping the condition above then, the accumulating chute 32 is fixed to the drawer mechanism 81 when the hangers 32*d* included in the accumulating chute support member 32A are operated to engage both ends of the accumulating chute 32. As a result, the accumulating chute 32 is also fixed to the manual medicine dispensing device 80.

If the hanger 32*d* is operated in the opposite direction to release the engagement of the hanger 32*d* with the accumulating chute 32, when the manual medicine dispensing device 80 is forwardly drawn from the housing 11 with the accumulating chute 32 fixed to the drawer mechanism 81, the fixation of the accumulating chute 32 with the drawer mechanism 81 for the manual medicine dispensing device 80 is released. As a result, the accumulating chute 32 can be lifted and removed with both operator's hands (see FIG. 9(A)).

A recess 32*c* that can be hung with operator's fingertips is formed in each side of the left side and right side of the upper end portions of the accumulating chute 32 to facilitate the work of lifting the accumulating chute 32 (see FIG. 8(B), FIG. 8(C) and FIG. 9(A)).

Further, the lower gathering chute 33 is the chute smaller than the above-described accumulating chute 32, and is mounted inside the drawer mechanism 81 of the manual medicine dispensing device 80. The gathering chute 33 is mounted to be slidable back and forth with respect to the gathering chute support member 33*a* that is pushed in and forwardly drawn from the housing 11 together with the drawer mechanism 81, and is located at the lower rear of the medicine dispensing device 80 (see FIGS. 1(A)-1(D), FIGS. 7(A)-7(B) and FIGS. 9(A)-9 (C)).

The gathering chute support member 33*a* (see FIG. 8(C) and FIGS. 9(A)-9(C)) is consisted of slide rail-like members provided inside the drawer mechanism 81, and allows the gathering chute 33 to be attached and detached behind the manual medicine dispensing device 80, and is also configured to be supported to be movable back and forth.

When the manual medicine dispensing device 80 is pushed into the housing 11 (see FIG. 7(A)), the gathering chute 33 is installed inside the housing 11, and the latter half of the gathering chute 33 is located directly below the accumulating chute 32 and further collects the tablets fallen from the accumulating chute 32 to the gathering chute 33, and the first half of the gathering chute 33 also collects the medicines discharged from the manual medicine dispensing device 80. Further, the gathering chute 33 is configured to put together the tablets discharged from the manual medicine dispersing device 80 in addition to the tablets discharged from the tablet feeder 13 within the housing 11 by releasing the collected tablets together to the lower part from the lower end of the gathering chute 33, and to put together all collected tablets mentioned above into an input hopper 41 of the packing device 40.

On the other hand, when the manual medicine dispensing device 80 is forwardly drawn from the housing 11 (see FIG. 7(B)), the gathering chute 33 is also forwardly drawn from the housing 11 accompanied by the drawing of the manual medicine dispensing device 80 in the same manner as the above-mentioned accumulating chute 32 (see FIGS. 8(A)-8 (C)).

Regardless of whether the manual medicine dispensing device 80 is forwardly drawn from the housing 11 or not, if the accumulating chute 32 is attached to the drawer mechanism 81 (see FIGS. 8(A)-8(C)), the back-and-forth movement of the gathering chute 33 is restricted within a slight length, and is normally urged forward and positioned at the rear of the manual medicine dispensing device 80.

In the configuration of this example (see FIGS. 8(A)-8 (C)), a restriction member 32*e* that restricts the backward movement range of the gathering chute is formed at a rear portion of the lower end of the accumulating chute 32 (see FIG. 8 (C)). The restriction member 32*e* protrudes downward to the extent that the restriction member 32*e* abuts and interferes with the rear part of the gathering chute 33. Further, a gathering chute biasing means 33*b* is provided to the lower end of the manual medicine dispensing device 80 (or a corresponding portion of the drawer mechanism 81). The gathering chute biasing means 33*b* (or the manual medicine dispensing device 80 or the drawer mechanism 81) is located at a place contacting and interfering with the front part of the gathering chute 33. Therefore, when the accumulating chute 32 is mounted on the drawer mechanism 81, the back-and-forth movement of the gathering chute 33 is restricted within a slight range obtained by subtracting the back-and-forth length of the upper end of the gathering chute 33 from the separation distance between the restriction member 32*e* which restricts the backward movement range of the gathering chute 33 and the gathering chute biasing means 33*b*.

Moreover, a magnetized ferromagnetic material such as a permanent magnet is adopted for the gathering chute biasing means 33*b*, and a material such as iron that is easily attracted to the gathering chute biasing means 33*b* is adopted for at least a portion of the gathering chute 33 that faces the gathering chute biasing means 33*b*. Therefore, when the upper end of the gathering chute 33 is located between the gathering chute biasing means 33*b* in the front and the restriction member 32*e* in the rear (see FIG. 8(C)), the gathering chute 33 slips on the upper surface of the gathering chute support member 33*a*, and is drawn to the gathering chute biasing means 33*b*.

Such gathering chute biasing means 33*b* is able to restrict the rearward movement range of the gathering chute 33 as mentioned above in the case that the gathering chute 32 is mounted on the gathering chute support member 32*a*, even when the manual medicine dispensing device 80 is forwardly drawn from the housing 11. Moreover, the gathering chute biasing means 33*b* has the function of drawing the gathering chute 33 forward and keeping a constant position relative to the manual medicine dispensing device 80, under the condition that the accumulating chute 32 is mounted on the accumulating chute support member 32A installed upright on the drawer mechanism 81 and the backward movement of the gathering chute 33 is restricted.

Furthermore, when the accumulating chute 32 is removed from the accumulating chute support member 32A with the manual medicine dispensing device 80 being forwardly drawn from the housing 11 (see FIG. 9(A)), the restriction member 32*e* which restricts the backward movement range of the gathering chute 33 is also coming out of the housing 11. As a result, the gathering chute 33 can be moved backward due to no interference with the restriction member 32*e*. Thereby, when the gathering chute 33 is moved backward against the force of the gathering chute biasing means 33*b* (see FIG. 9(B)), the entire gathering chute 33 is positioned between the front surface of the housing 11 and the rear end of the manual medicine dispensing device 80. The position of the entire gathering chute 33 is a rear position where the gathering chute 33 can be lifted from the manual medicine dispensing device 80, the drawer mechanism 81, and the gathering chute support member 33*a*.

The gathering chute 33 has handle members 33*c*, 33*c* mounted at both ends of the upper surface of the gathering chute 33 (see FIG. 9(C)). The gathering chute 33 (the third falling object collection section) can be easily and safely removed from the medicine dispensing apparatus 10 by hanging the operator's fingertips on the left and right handle members 33*c*, 33*c* and lifting with the operator's both hands.

Further, the gathering chute 33 can be easily and safely attached to a predetermined position by performing the procedure in reverse.

The manner of use and operation of the medicine dispensing apparatus 10 of Example 1 will be described with reference to FIGS. 1(A)-9(C) described above.

The manner of use and dispensing operation of this medicine dispensing apparatus 10 are basically the same as those of conventional medicine dispensing apparatuses, and if there is the tablet feeder 13 that is known to require to be replenished with medicines (tablets) in advance, the predetermined medicines (tablets) can be filled with in the exposed corresponding feeder 13 by being forwardly drawn the medicine feeder storage portion 12 from the housing 11 (see FIG. 2(A)). Then, the medicine feeder storage portion 12 is pushed back into the housing 11 (see FIG. 1(A) and FIG. 1(B)), and a dispensing instruction is further given to the medicine dispensing apparatus 10 by operating the touch panel 14 or the like. If the prescription includes the medicines (tablets) which no tablet 13 has been assigned, manual dispensing guidance will be displayed on the touch panel 14 by the control device, so the manual dispensing device 80 is pulled out from the housing (see FIG. 1(D) and FIG. 8(A)), and the medicines are manually dispensed in each compartment (cell) from the top surface of the manual medicine dispensing device 80 according to the manual dispensing guidance.

When an instruction to start dispensing medicines is given to the medicine dispensing apparatus 10 by operating the touch panel 14 or the like, the medicines to be dispensed are discharged from the tablet feeders 13 in which the respective tablets are stored. The discharged medicines are guided by the upper medicine collecting mechanism 20 to the lower temporary reserving mechanism 60 (see FIG. 2(B)), and temporarily stored in the lower temporary reserving mechanism 60.

Then, after an appropriate passage of time has elapsed, the electric motor 51 rotates the output shaft once, and accordingly, all the temporary reserving mechanisms 60 swing the opening/closing member 63 via the cam mechanism 52 and the link mechanism 70 in corresponding with the rotation of the output shaft (see FIGS. 4(A) to 5(C)). As a result, all the medicines stored in the temporary reserving mechanism 60 fall from the temporary reserving mechanism multi-row storage portion 50 all at once.

The falling medicines are then guided to the input hopper 41 of the packing device 40 by the lower medicine collecting mechanism 30. At this time, the manual dispensed medicines of the manual medicine dispensing device 80 also join at the gathering chute 33, and the medicines to be dispensed in one package are collected and packed into the divided package by the lower packing device 40. In this way, the necessary medicines are automatically packed one after another.

Moreover, in this case, the tablet falling path from the tablet feeder 13 to the temporary reserving mechanism 60 and the tablet falling path from the temporary reserving mechanism 60 to the packing device 40 are almost separated by the opening/closing operation of the temporary reserving mechanism 60. Therefore, most of the medicine falling on the upper medicine collecting mechanism 20 side and the medicine falling on the lower medicine collecting mechanism 30 side can be operated in parallel, so that the total time for making multiple or large numbers of packages which are made based on one prescription/dispensing instruction sheet is reduced.

As a result, the above-mentioned medicine packing operation being repeated when regular or irregular internal cleaning becomes necessary, the automatic operation of the medicine dispensing apparatus 10 is stopped, and the required cleaning for each part (20, 60, 30, 40) consisting of the medicine falling path is carried out.

First, with respect to the packing device 40, cleaning can be easily carried out, because almost all the components including the input hopper 41 are exposed when the base member 42 on which the packing device 40 is placed is forwardly drawn from the housing 11 (see FIG. 1(C)).

In addition, with respect to the upper medicine collecting mechanism 20 incorporated in the tablet feeder storage portion 12, the medicine falling path can be easily cleaned, because the upper medicine collecting mechanism 20 can be pulled out individually with separating the upper medicine collecting mechanism 20 to the left and right, or the upper medicine collecting mechanism 20 can be opened to the left and right after pulling out the upper medicine collecting mechanism 20. Note that since this point is well known, for example, in Patent Documents 2 and 3, so specific illustrations and detailed explanations are omitted.

With respect to the temporary reserving mechanism 60, the tablet falling path can be easily cleaned, because the temporary reserving mechanism 60 can be forwardly drawn from the housing together with the tablet feeder storage portion 12 (see FIGS. 2(A)-3(D)).

With regard to the upper fixed chute 31 of the lower medicine collecting mechanism 30, when the tablet feeder storage portion 12 is forwardly drawn from the housing 11, the temporary reserving mechanism 60 is also drawn from the temporary reserving mechanism multi-row storage portion 50 accompanied by the drawing operation. In addition, since the multi-row simultaneous driving mechanisms 51 to 55 are collectively arranged at the rear part of the temporary reserving mechanism multi-row storage portion 50 (see FIG. 6), when the side plate 11*a* is removed, not only the upper end of the fixed chute 31 (the first falling object collection section) is exposed, but also a large empty space manifests above the fixed chute 31.

Therefore, since the fixed chute 31 has a lower constriction structure at the bottom, it is easy to see the medicine falling path provided on the inside of the fixed chute 31 even from diagonally above, and even if the fixed chute 31 is a large fixed type, or even when cleaning is further carried out in a posture where the operator looks into the fixed chute 31 from above, the cleaning of the medicine falling path can be easily and accurately carried out.

Moreover, with regard to this fixed chute 31, the burden of maintaining a clean state can be reduced by improving the multi-row simultaneous driving mechanisms 51 to 55 and the temporary reserving mechanism 60.

Specifically, with respect to the leftmost single-row reserving mechanism 60*a* and the temporary reserving mechanism 60 to the right of the leftmost single-row reserving mechanism 60*a* (see FIG. 5(A)), the fixed side plate 62, which is a non-swinging member, is located on the left side, and the opening/closing member 63, which is a lower end swinging type swinging member, is located on the right side, and both the fixed side plate 62 and the opening/closing member 63 are facing each other (see FIG. 4(A)-4(C)). In addition, the right side of the side plate 62 is sloped to form a right slope that looks diagonally upward to the right. In this condition, when the lower end of the opening/closing member 63 swings toward and away from the lower part of the side plate 62, the medicine falling path formed between the side plate 62 and the opening/closing member 63 becomes a lower constriction structure, and the bottom end of the medicine falling path opens and closes. As a result, when the opening/closing member 63 swings (see FIG. 4(B) and FIG. 4(C)), the medicines retained in the closed leftmost single-row reserving mechanism 60*a* or the like (see FIG. 4(A)) move diagonally downward to the right along the inclined surface of the side plate 62 while being guided in the swinging direction, and then leave the temporary reserving mechanism 60 and freely fall diagonally downward to the right.

On the other hand, with regard to the rightmost single-row reserving mechanism 60*b* and the temporary reserving mechanism 60 to the left of the rightmost single-row reserving mechanism 60*b* (see FIG. 5(A)), the fixed side plate 62, which is a non-swinging member, is located on the right side, and the opening/closing member 63, which is a lower end swinging type swinging member, is located on the left side, and both the fixed side plate 62 and the opening/closing member are facing each other (FIG. 2(D) and FIG. 3(D)), In addition, the left side of the side plate 62 is sloped to form a left slope that looks diagonally upward to the left. In this condition, the lower end of the opening/closing member 63 swings toward and away from the lower part of the side plate 62, the medicine falling path formed between the side plate 62 and the opening/closing member 3 becomes a lower constriction structure, and the lower end can be opened and closed, the bottom end of the medicine falling path opens and closes. As a result, when the opening/closing member 63 swings (see FIG. 3(D)), the medicines retained in the closed rightmost single-row reserving mechanism 60*b* or the like (see FIG. 2(D)) move diagonally downward to the left along the inclined surface of the side plate 62 while being guided in the swinging direction, and then leave the temporary reserving mechanism 60 and freely fall diagonally downward to the left.

In this way, the medicines are released diagonally downward to the right from the leftmost single-row reserving mechanism 60*a* and the temporary reserving mechanism 60 to the right of the leftmost single-row reserving mechanism 60*a*, and the medicines are released diagonally downward to the left from the rightmost single-row reserving mechanism 60*b* and the temporary reserving mechanism 60 to the left of the rightmost single-row reserving mechanism 60*b*. However, the medicine falling path of the fixed chute 31 that receives the released medicines has a lower constriction structure toward both left/right and front/back (see FIGS. 6(A)-6(B)). Therefore, the medicines which are fallen from any of the single-row reserving mechanisms 60 and are pathing through the medicine falling path of the fixed chute 31 (the first falling object collection section), hit the inner surface of the fixed chute 31 that defines the medicine falling path at similar angles. As a result, the tablet does not bounce significantly even if the tablet comes into contact with the inner surface of the medicine falling path, and the impact on the falling tablet is only slight. Moreover, there is less undesirable variation or excessive extension of the falling path, and decrease in the falling speed is also small.

Therefore, in the fixed chute 31 located below the temporary reserving mechanism 60, the tablet collection time is short, and the medicine falling path is hard to get dirty, so that the burden of maintaining the clean state is light.

In addition, as described above, by setting the origin sensor 55 at the multi-row simultaneous driving mechanisms 51 to 55 (see FIGS. 4(A)-4(C)) and stabilizing the timing of separation and engagement between the electric motor 51 and the temporary reserving mechanism 60, the falling timing of the tablets falling from the leftmost single-row reserving mechanism 60*a*, the rightmost single-row reserving mechanism 60*b*, and the temporary reserving mechanisms 60, 60 located between the leftmost single-row reserving mechanism 60*a* and the rightmost single-row reserving mechanism 60*b* to the fixed chute 31 (the first falling object collection section) will be also aligned. In addition, the impact and vibration generated on the fixed chute 31 (the first falling object collection section) due to the collision of falling tablets are contained within a short period of time, and since the time for staining to occur is shortened, suppression of staining for the fixed chute 31 can also be helpful.

The accumulating chute 32 and the gathering chute 33 of the lower medicine collecting mechanism 30 are arranged behind the manual medicine dispensing device 80, so when cleaning the medicine falling path, etc., the manual medicine dispensing device 80 should be forwardly drawn from the housing before cleaning (see FIGS. 7(A)-7(B)).

As a result, (see FIGS. 8(A)-8(C)), the accumulating chute 32 is exposed at the rear of the manual medicine dispensing device 80 (see FIG. 8(A)), and the accumulating chute support member 32*a* and the hanger 32*d* are also exposed (see FIG. 8(B)), the hanger 32*d* is operated to release the fixed engagement of the accumulating chute 32 with the accumulating chute support member 32A.

Then, when the accumulating chute 32 is lifted by hooking the operator's fingertips on a recess 32*c*, both ends of the accumulating chute 32 are separated from the upper end 32*b* of the accumulating chute support member 32A, and the accumulating chute 32 is removed from the housing 11 (see FIG. 9(A)), the accumulating chute 32 is free to be carried by itself.

Therefore, the accumulating chute 32 can be easily and accurately performed for various maintenance operations including cleaning the inner tablet falling surface. If there is a spare accumulating chute 32, the used accumulating chutes 32 can be cleaned while medicine dispensing continues by replacing the used accumulating chute 32 with the spare accumulating chute and promptly restarting the dispensing operation of the medicine dispensing apparatus 10.

When the accumulating chute 32 is removed from the medicine dispensing apparatus 10 (see FIG. 9(A)), the restriction member 32*e* (see FIG. 8(C)) that restricts the backward movement range of the gathering chute is removed from the rear of the gathering chute 33.

Therefore, if the gathering chute 33 is pushed rearward with a force stronger than the attractive force of the gathering chute biasing means 33*b*, the gathering chute 33 is guided by the gathering chute support member 33A and moves to the rear of the manual medicine dispensing device 80, and the upper end of the gathering chute 33 including the handle member 33*c* is entirely exposed (see FIG. 9(B)).

Then, when the gathering chute 33 is lifted by hooking the handle member 33*c* with the operator's fingertips, both ends of the gathering chute 33 are separated from the gathering chute support member 33A, the gathering chute 33 is entirely removed from the housing, and the gathering chute 33 is free to be carried by itself (see FIG. 9(C)).

Therefore, the accumulating chute 32 can be easily and accurately performed for various maintenance operations including cleaning the inner tablet falling surface in the same manner as the above-mentioned accumulating chute 32. If there is a spare gathering chute 33, the used gathering chutes 33 can be cleaned while medicine dispensing continues by replacing the used gathering chutes 33 with the spare gathering chute and promptly restarting the dispensing operation of the medicine dispensing apparatus 10.

EXAMPLE 2

The specific configuration of Example 2 of the medicine dispensing apparatus 4: invention will be described with reference to the drawings.

FIGS. 10(A)-10(B) shows the structure of a medicine dispensing apparatus 90 according to the second example, in which FIG. 10(A) is a front view, FIG. 10(B) is an E-E cross sectional view, and FIG. 11 shows a plane view of three rows temporary reserving mechanisms 60 and the corresponding multi-row simultaneous driving mechanism 91 and link mechanism 92.

The points, for which the medicine dispensing apparatus 90 is different from the medicine dispensing apparatus 10 of the first example described above, are that the number of tablet feeder storage portions 12 arranged in rows on the left and right in the housing 11 of the medicine storage is reduced by one from four to three (see FIGS. 10(A)-10(B)), and correspondingly, there are now three temporary reserving mechanisms 60 (see FIG. 11), the two sets of multi-row simultaneous driving mechanisms 51 to 55 have been changed into one set of multi-row simultaneous driving mechanism 91, and the two sets of link mechanisms 70 have been changed into one set of link mechanisms 92.

Further, due to the above-mentioned difference, the width of the housing 11 (see FIG. 10(A)) and the width of the fixed chute 31 (the first falling object collection section) are narrower (see FIG. 10(A)).

To explain each part in detail, regarding the temporary reserving mechanism 60 (see FIG. 11), the second one from the leftmost is omitted, and the leftmost single-row reserving mechanism 60*a,* the second temporary reserving mechanism 60 from the rightmost and the rightmost single-row reserving mechanism 60*b* are remained.

With regard to the multi-row simultaneous driving mechanism 91 (see FIG. 11), the second cam mechanism 52 from the leftmost and the left electric motor 51 are also omitted. The right electric motor 51, the first and second cam mechanisms 52 and 52 from the rightmost and the leftmost cam mechanism 52 are remained.

With respect to the link mechanism 92, the second swinging member 72 from the leftmost and the biasing spring 74 are also omitted, and the left and right connecting members 71 are combined into one. Furthermore, in the left transmission mechanisms extending from the electric motor 51 as the drive source to the leftmost single-row reserving mechanism 60*a,* a rotation reversal mechanism 93 for reversing the direction of rotational movement around the shaft is implemented between the leftmost swinging member 72 and the cam mechanism 52 of the leftmost single-row reserving mechanism 60*a*. The rotation reversal mechanism 93 is composed of, for example, a pair of spur gears, and converts the swinging motion of the swinging member 72 into a swinging motion in the opposite direction, and transmits the swinging motion to the cam mechanism 52 and further to the support shaft 64.

Among the temporary reserving mechanisms 60 driven by the above-mentioned multi-row simultaneous driving mechanism 91 via such a link mechanism 92, the leftmost single-row reserving mechanism 60*a* and the rightmost single-row reserving mechanism 60*b* share the electric motor 51 as the drive source for rotational motion. Further, the opening/closing member 63 of the leftmost single-row reserving mechanism 60*a* and the opening/closing member 63 of the rightmost single-row reserving mechanism 60*b* swing in the opposite directions. Since the opening/closing member 63 of the leftmost single-row reserving mechanism 60*a* on the left side opens the lower end portion toward the lower right and the opening/closing member 63 of the rightmost single-row reserving mechanism 60*b* on the right side opens the lower end portion toward the lower left, both the single-row reserving mechanisms 60*a* and 60*b* located at both left and right ends drop the medicines in the direction near the center.

In this case, the electric motor 51, which is the only rotational drive source, makes the three swinging members 72 swing together in the same direction via the cam mechanism 52 to be driven and the connecting member 71. However, as described above, the rotation reversal mechanism 93 is interposed between the leftmost swinging member 72 and the leftmost cam mechanism 52, whereas t rotation reversal mechanism 93 is not interposed between the rightmost swinging member 72 and the rightmost cam mechanism 52 and is directly connecting the rightmost swinging member 72 with the rightmost cam mechanism 52. Although the single electric motor 51 can be commonly used for the leftmost single-row reserving mechanism 60*a* and the rightmost single-row reserving mechanism 60*b* as a rotational drive source, the leftmost single-row reserving mechanism 60*a* releases the medicine diagonally downward to the right, and the rightmost single-row reserving mechanism 60*b* releases the medicine diagonally downward to the left. Therefore, this medicine dispensing apparatus 90 also allows the medicines that have fallen from the left and right single-row reserving mechanisms 60*a* and 60*b* and entered the medicine falling path of the fixed chute 31 to quickly but gently pass through the fixed chute 31 without making a large jump.

Others

Although not mentioned in the description of the above examples, the fixed chute 31, the accumulating chute 32 and the gathering chute 33 may be formed of partition plates having the shape illustrated in FIGS. 8(A)-9(C) or other appropriate shapes may be incorporated in an appropriate number.

In the above example, the gathering chute support member 33*a* is constructed as a separate member from the drawer mechanism 81, but since the gathering chute support member 33*a* is forwardly drawn from and pushed in the housing accompanied by being forwardly drawn and pushed in the drawer mechanism 81, the gathering chute support member 33*a* may be configured as an accessory of the drawer mechanism 81, or may be integrated with the drawer mechanism 81.

In the second example described above, the rotation reversal mechanism 93 for reversing the direction of rotational motion is incorporated in the left transmission mechanism from the electric motor 51 as the drive source to the leftmost single-row reserving mechanism 60*a*. The installation position of the rotation reversal mechanism 93 is not restricted at the left transmission mechanism, and the rotation reversal mechanism 93 may be incorporated in the right transmission mechanism from the electric motor 51 as the drive source to the rightmost single-row reserving mechanism 60*b*.

The applications of the medicine dispensing apparatus of the present invention are not limited only to the medicine dispensing apparatus exclusively for the tablet dispensing apparatus illustrated in Examples 1 and 2 above, but also the other applications of the medicine dispensing apparatus of the present invention equipped with a powder medicine dispensing mechanism in addition to the tablet dispensing mechanism having the tablet collecting mechanism and the temporary reserving mechanism described above.

INDUSTRIAL APPLICABILITY

According to the present invention, the tablet dispensing apparatus can be provided that the work of cleaning for the tablet falling surface of the gathering chute and the accumulating chute can be easily and accurately carried out in order to further reduce the burden of maintaining the cleanliness of the gathering chute and the accumulating chute in the lower tablet collecting mechanism.

DESCRIPTION OF THE REFERENCE NUMERALS

10 . . . medicine dispensing apparatus, 11 . . . housing, 11*a* . . . side plate, 12 . . . tablet feeder storage portion, 13 . . . tablet feeder, 13*a* . . . base part, 13*b* . . . cassette, 14 . . . touch panel, 20 . . . upper medicine collecting mechanism, 24 . . . tablet guide path sliding plate, 25 . . . tablet guide path sliding opening, 26 . . . tablet feeder non-mounted portion, 30 . . . lower medicine collecting mechanism, 31 . . . fixed chute, 32 . . . accumulating chute, 32*a* . . . accumulating chute support member, 32*b* . . . upper end, 32*c* . . . recess, 32*d* . . . hanger, 32*e* . . . restriction member, 33 . . . gathering chute, 33*a* . . . gathering chute support member, 33*b* . . . gathering chute biasing means, 33*c* . . . handle member, 40 . . . packing device, 41 . . . input hopper, 42 . . . base member, 50 . . . temporary reserving mechanism (multi-row storage portion), 51-55 . . . multiple simultaneous driving mechanism, mechanism, 53 . . . origin node, 51 . . . electric motor, 52 . . . cam 54 . . . follower node, 55 . . . origin sensor, 60 . . . temporary reserving mechanism (single-row reserving mechanism), 60*a* . . . leftmost single-row reserving mechanism, 60*b* . . . rightmost single-row reserving mechanism, 61 . . . box frame, 62 . . . side plate (non-swinging member), 63 . . . opening/closing member (swinging member), 63*a* . . . opening, 71 . . . connecting member, 72 . . . swinging member, 72*a* . . . swinging end portion, 72*b* . . . swinging fulcrum portion, 74 . . . biasing spring, 80 . . . manual e dispensing device, 81 . . . drawer mechanism, 90 . . . medicine dispensing apparatus, 91 . . . multiple simultaneous driving mechanism, 92 . . . link mechanism, 93 . . . rotation reversal mechanism.

The invention claimed is:

1. A medicine dispensing apparatus comprising:

a housing;

a plurality of tablet feeder storage portions each equipped with a plurality of tablet feeders that accommodate tablets and sequentially discharge the tablets, the plurality of tablet feeder storage portions being configured to be housed in the housing and to be individually drawable forward from the housing;

a plurality of upper tablet collecting mechanisms which are provided in the tablet feeder storage portions and which guide the tablets discharged from the plurality of tablet feeders downward and drop the tablets;

a lower tablet collecting mechanism provided below the plurality of tablet feeder storage portions and configured to collect tablets that have fallen from the plurality of upper tablet collecting mechanisms and to guide the tablets downward;

a packing device provided under the lower tablet collecting mechanism to separately pack the tablets discharged from the lower tablet collecting mechanism into a packing band; and a manual medicine dispensing device placed in front of the lower tablet collecting mechanism and configured to be drawable forward from the housing, wherein:

the lower tablet collecting mechanism includes an accumulating chute accumulating fallen tablets discharged from the upper tablet collecting mechanisms at a rear of the manual medicine dispensing device, and a gathering chute letting fall while gathering both tablets fallen from the accumulating chute and tablets fallen from the manual medicine dispensing device, the accumulating chute is forwardly drawn out of the housing together with the manual medicine dispensing device, an accumulating chute support member detachably supporting the accumulating chute is positioned at the rear of the manual medicine dispensing device, the accumulating chute is attached to the accumulating chute support member with an upper end of the accumulating chute resting on an upper end of the accumulating chute support member, a gathering chute support member that detachably supports the gathering chute is provided at the rear of the manual medicine dispensing device, the gathering chute is forwardly drawn out of the housing together with the manual medicine dispensing device, the gathering chute is capable of moving away from the manual medicine dispensing device to a rear position in which the gathering chute can be lifted when the accumulating chute is detached from the accumulating chute support member while the manual medicine dispensing device is forwardly drawn out of the housing, and a backward movement range of the gathering chute is restricted when the accumulating chute is attached to the accumulating chute support member even if the manual medicine dispensing device is forwardly drawn out of the housing.

2. The medicine dispensing apparatus according to claim 1, wherein the accumulating chute support member comprises a pair of supporting structures, the pair of supporting structures are placed on left and right sides of the accumulating chute at the rear of the manual medicine dispensing device, and a pair of upper end portions of both the left and right sides of the accumulating chute rest on upper end portions of the pair of supporting structures.

3. The medicine dispensing apparatus according to claim 2, wherein a recess that can receive fingertips is formed on a side of each of the pair of upper end portions of the accumulating chute.

4. The medicine dispensing apparatus according to claim 1, wherein a gathering chute biasing means is provided to pull forward the gathering chute in a state in which a backward movement of the gathering chute is restricted as a result of the accumulating chute being attached to the accumulating chute support member.

5. The medicine dispensing apparatus according to claim 1, wherein a handle member on which fingertips can be hung is attached to an upper end surface of the gathering chute.

6. The medicine dispensing apparatus according to claim 4, wherein a handle member on which fingertips can be hung is attached to an upper end surface of the gathering chute.

7. A medicine dispensing apparatus comprising:

a housing:

a plurality of tablet feeder storage portions each equipped with a plurality of tablet feeders that accommodate tablets and sequentially discharge the tablets, the plurality of tablet feeder storage portions being configured to be housed in the housing and to be individually drawable forward from the housing;

a plurality of upper tablet collecting mechanisms which are provided in the tablet feeder storage portions and which guide the tablets discharged from the plurality of tablet feeders downward and drop the tablets;

a lower tablet collecting mechanism provided below the plurality of tablet feeder storage portions and configured to collect tablets that have fallen from the plurality of upper tablet collecting mechanisms and to guide the tablets downward;

a packing device provided under the lower tablet collecting mechanism to separately pack the tablets discharged from the lower tablet collecting mechanism into a packing band;

a manual medicine dispensing device placed in front of the lower tablet collecting mechanism and configured to be drawable forward from the housing, wherein:

the lower tablet collecting mechanism includes an accumulating chute accumulating fallen tablets discharged from the upper tablet collecting mechanisms at a rear of the manual medicine dispensing device, and a gathering chute letting fall while gathering both tablets fallen from the accumulating chute and tablets fallen from the manual medicine dispensing device, the accumulating chute is forwardly drawn out of the housing together with the manual medicine dispensing device, an accumulating chute support member detachably supporting the accumulating chute is positioned at the rear of the manual medicine dispensing device, and the accumulating chute is attached to the accumulating chute support member with an upper end of the accumulating chute resting on an upper end of the accumulating chute support member;

a plurality of single-row reserving mechanisms provided to lower end portions of the plurality of tablet feeder storage portions, which temporarily reserve the tablets fallen from the upper tablet collecting mechanisms and then release the tablets; and a multi-row simultaneous driving mechanism that is provided deep inside the housing and that operates the plurality of single-row reserving mechanisms at the same time to discharge the tablets all at once;

wherein the single-row reserving mechanisms and the multi-row simultaneous driving mechanism are separated from or engaged with each other in accordance with forward and backward movements of the single-row reserving mechanisms that occur when the tablet feeder storage portions corresponding to the single-row reserving mechanisms are moved in and out of the housing, wherein a leftmost single-row reserving mechanism located at a leftmost position in the housing among the plurality of single-row reserving mechanisms includes a left side non-swinging member having a right slope that extends diagonally upward and a right side swinging member facing the left side non-swinging member, and a tablet falling path with a downward constriction is formed between the left side non-swinging member and the right side swinging member, and wherein a rightmost single-row reserving mechanism located at a rightmost position in the housing among the plurality of single-row reserving mechanisms includes a right side non-swinging member having a left slope that extends diagonally upward and a left side swinging member facing the right side non-swinging member, and a tablet falling path with a downward constriction is formed between the right side non-swinging member and the left side swinging member.

8. The medicine dispensing apparatus according to claim 7, wherein the multi-row simultaneous driving mechanism includes a left drive source that drives a member including the leftmost single-row reserving mechanism, and a right drive source that drives a member including the rightmost single-row reserving mechanism.

9. The medicine dispensing apparatus according to claim 7, wherein the leftmost single-row reserving mechanism and the rightmost single-row reserving mechanism share a driving source for rotational movement, and a rotation reversal mechanism reversing a direction of rotational motion is provided in either a left transmission mechanism between the driving source and the leftmost single-row reserving mechanism or a right transmission mechanism between the driving source and the rightmost single-row reserving mechanism.

10. The medicine dispensing apparatus according to claim 7, wherein the multi-row simultaneous driving mechanism includes an electric motor as a drive source and an origin sensor that detects a rotation stop position of an output shaft of the electric motor, the multi-row simultaneous driving mechanism being configured to stop rotation of the output shaft of the electric motor when the origin sensor detects that the single-row reserving mechanisms and the multi-row simultaneous driving mechanism are separated.

11. The medicine dispensing apparatus according to claim 8, wherein the multi-row simultaneous driving mechanism includes an electric motor as a drive source and an origin sensor that detects a rotation stop position of an output shaft of the electric motor, the multi-row simultaneous driving mechanism being configured to stop rotation of the output shaft of the electric motor when the origin sensor detects that the single-row reserving mechanisms and the multi-row simultaneous driving mechanism are separated.

12. The medicine dispensing apparatus according to claim 9, wherein the multi-row simultaneous driving mechanism includes an electric motor as a drive source and an origin sensor that detects a rotation stop position of an output shaft of the electric motor, the multi-row simultaneous driving mechanism being configured to stop rotation of the output shaft of the electric motor when the origin sensor detects that the single-row reserving mechanisms and the multi-row simultaneous driving mechanism are separated.

* * * * *